(12) United States Patent
Datema et al.

(10) Patent No.: US 11,759,974 B2
(45) Date of Patent: Sep. 19, 2023

(54) CONCRETE BUILDUP LOCATION DETERMINATION

(71) Applicant: Oshkosh Corporation, Oshkosh, WI (US)

(72) Inventors: Bryan S. Datema, Oshkosh, WI (US); Zhenyi Wei, Oshkosh, WI (US); Ted Tesmer, Oshkosh, WI (US)

(73) Assignee: Oshkosh Corporation, Oshkosh, WI (US)

( * ) Notice: Subject to any disclaimer, the term of this patent is extended or adjusted under 35 U.S.C. 154(b) by 326 days.

(21) Appl. No.: 17/158,442

(22) Filed: Jan. 26, 2021

(65) Prior Publication Data

US 2021/0229320 A1 Jul. 29, 2021

Related U.S. Application Data

(60) Provisional application No. 62/966,331, filed on Jan. 27, 2020.

(51) Int. Cl.
*B28C 5/42* (2006.01)
*B60P 3/16* (2006.01)
*B28C 7/02* (2006.01)

(52) U.S. Cl.
CPC .............. *B28C 5/422* (2013.01); *B28C 5/421* (2013.01); *B28C 7/026* (2013.01); *B60P 3/16* (2013.01)

(58) Field of Classification Search
CPC .................................. B28C 5/422; B28C 7/026
See application file for complete search history.

(56) References Cited

U.S. PATENT DOCUMENTS

| | | | |
|---|---|---|---|
| 7,578,379 B2 | 8/2009 | Gillmore et al. | |
| 7,648,015 B2 | 1/2010 | Gillmore et al. | |
| 7,792,618 B2 * | 9/2010 | Quigley | G07C 5/08 701/32.8 |
| 7,931,397 B2 | 4/2011 | Lindblom et al. | |
| 8,287,173 B2 | 10/2012 | Khouri | |
| 8,613,543 B2 | 12/2013 | Lindblom et al. | |
| 8,646,965 B2 | 2/2014 | Datema et al. | |
| D737,866 S | 9/2015 | Datema et al. | |
| D772,306 S | 11/2016 | Datema et al. | |
| 9,694,671 B2 | 7/2017 | Wildgrube et al. | |
| 10,239,403 B2 | 3/2019 | Broker et al. | |
| 10,414,067 B2 | 9/2019 | Datema et al. | |
| 10,792,613 B1 | 10/2020 | Drake et al. | |
| 10,843,379 B2 | 11/2020 | Rocholl et al. | |
| 10,901,409 B2 | 1/2021 | Datema et al. | |

(Continued)

*Primary Examiner* — Elizabeth Insler
(74) *Attorney, Agent, or Firm* — Foley & Lardner LLP

(57) ABSTRACT

A vehicle includes a chassis, a drum, a load detection system, and a control system. The drum is coupled to the chassis and is configured to mix drum contents received therein. The load detection system is coupled to the chassis and includes a load sensor. The load sensor is positioned proximate to one of a forward end of the drum and a rear end of the drum. The load sensor is configured to determine a portion of a force applied by the drum to the chassis. The control system is communicably coupled to the load detection system and is configured to determine a longitudinal position of a concrete buildup in the drum based on the portion. The control system is also configured to generate at least one of a notification indicating the longitudinal position or a control signal based on the longitudinal position.

20 Claims, 14 Drawing Sheets

(56) References Cited

U.S. PATENT DOCUMENTS

| | | | |
|---|---|---|---|
| 10,940,610 B2 | 3/2021 | Clifton et al. | |
| 10,987,829 B2 | 4/2021 | Datema et al. | |
| 10,997,802 B2 | 5/2021 | Koga et al. | |
| 2018/0250847 A1 | 9/2018 | Wurtz et al. | |
| 2019/0126510 A1* | 5/2019 | Roberts | B28C 7/026 |
| 2019/0217698 A1 | 7/2019 | Broker et al. | |
| 2019/0325220 A1 | 10/2019 | Wildgrube et al. | |
| 2019/0344475 A1 | 11/2019 | Datema et al. | |
| 2020/0094671 A1 | 3/2020 | Wildgrube et al. | |
| 2020/0230841 A1 | 7/2020 | Datema et al. | |
| 2020/0230842 A1 | 7/2020 | Datema et al. | |
| 2020/0265656 A1 | 8/2020 | Koga et al. | |
| 2020/0346657 A1 | 11/2020 | Clifton et al. | |
| 2020/0398857 A1 | 12/2020 | Clifton et al. | |
| 2020/0401807 A1 | 12/2020 | Wildgrube et al. | |
| 2021/0001765 A1* | 1/2021 | Beaupre | B28C 5/422 |
| 2021/0031649 A1 | 2/2021 | Messina et al. | |
| 2021/0039719 A1 | 2/2021 | Datema et al. | |
| 2021/0069934 A1 | 3/2021 | Rocholl et al. | |
| 2021/0107179 A1 | 4/2021 | Glunz | |
| 2021/0124347 A1 | 4/2021 | Datema et al. | |

* cited by examiner

CONCRETE BUILDUP LOCATION DETERMINATION

CROSS-REFERENCE TO RELATED PATENT APPLICATIONS

The present application claims the benefit of and priority to U.S. Provisional patent Application No. 62/966,331, filed Jan. 27, 2020, the entire disclosure of which is hereby incorporated by reference herein.

BACKGROUND

Concrete mixer vehicles are configured to receive, mix, and transport wet concrete or a combination of ingredients that when mixed form wet concrete to a job site. Concrete mixer vehicles include a rotatable mixer drum that mixes the concrete disposed therein.

SUMMARY

One embodiment relates to a vehicle. The vehicle includes a chassis and a drum coupled to the chassis and configured to mix drum contents received therein. The vehicle also includes a load detection system coupled to the chassis. The load detection system includes a load sensor positioned proximate to one of a forward end of the drum and a rear end of the drum. The load sensor is configured to determine a portion of a force applied by the drum to the chassis. The vehicle additionally includes a control system communicably coupled to the load detection system. The control system is configured to determine a longitudinal position of a concrete buildup in the drum based on the portion and to generate at least one of a notification indicating the longitudinal position or a control signal based on the longitudinal position.

Another embodiment relates to a concrete buildup location determination system for a concrete mixer. The concrete buildup location determination system includes a sensor and a control system. The sensor is positionable to facilitate monitoring a portion of a force applied by a drum of the concrete mixer to a chassis of the concrete mixer. The control system is communicably coupled to the sensor. The control system is configured to determine the portion from the sensor, determine a longitudinal position of a concrete buildup within the drum based on the portion, and to generate at least one of a notification indicating the longitudinal position or a control signal based on the longitudinal position.

Another embodiment relates to a method of concrete buildup detection. The method includes determining, by a control system of a concrete mixer, a portion of a force applied by a drum of the vehicle to a chassis of the vehicle based on a signal received from a load sensor onboard the vehicle. The method also includes determining, by the control system, a longitudinal position of a concrete buildup in the drum based on the portion. The method further includes generating, by the control system, at least one of a notification indicating the longitudinal position or a control signal based on the longitudinal position.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Figure 1:
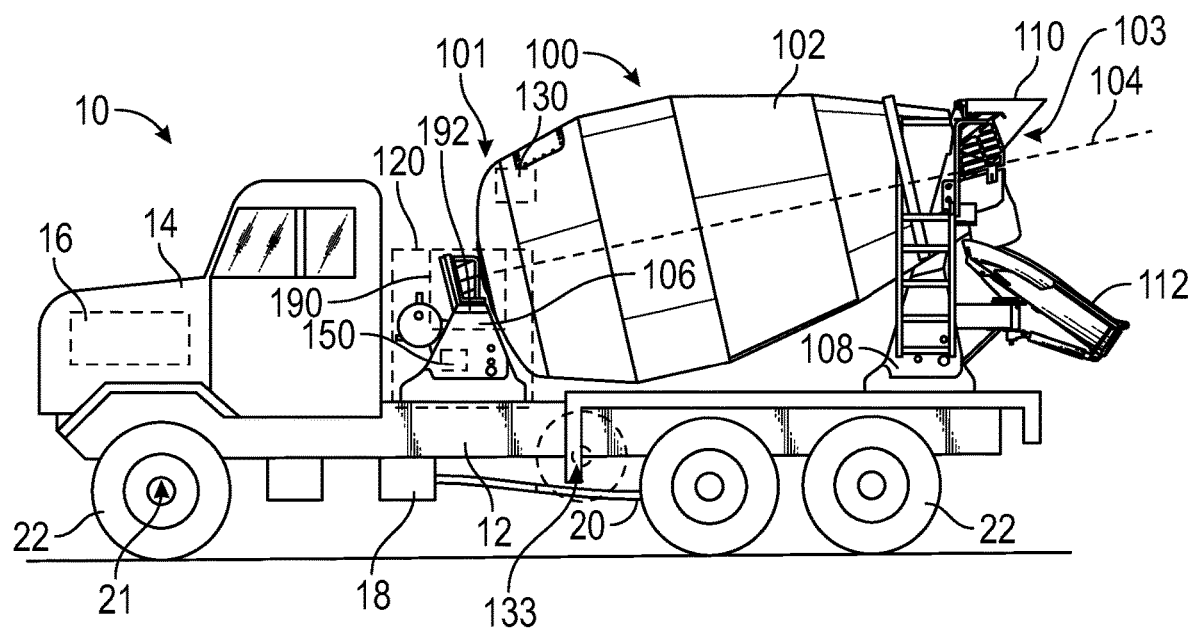
FIG. 1 is a side view of a concrete mixer truck with a drum assembly and a control system, according to an exemplary embodiment.

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

According to an exemplary embodiment, a concrete mixer vehicle includes a chassis (e.g., frame), a drum rotatably coupled to the chassis, and a concrete buildup location determination system. The drum is configured to receive a concrete mixture, and to rotate with respect to the chassis to mix the concrete mixture. The concrete buildup location determination system includes a load cell configured to monitor at least a portion of a force applied by the drum to the chassis. The load cell is positioned proximate to one of a forward end of the drum or a rear end of the drum, between the drum and the chassis. According to an exemplary embodiment, the load cell is a plate-type load cell that is mounted to an upper surface of a support (e.g., pedestal) for the drum. The concrete buildup location determination system also includes a buildup control system communicably coupled to the load cell and configured to receive information from the load cell (e.g., force measurements, load, voltage, etc.). In some embodiments, the buildup control system is configured to determine the portion of the force based on the information; for example, by converting the voltage measurements into a force using a lookup table, or a predefined algorithm. According to an exemplary embodiment, the buildup control system is configured to determine a longitudinal position of the concrete buildup based on the force. The longitudinal position may be a position within the drum, between the forward end of the drum and the rear end of the drum, at which the concrete buildup has accumulated (e.g., a center of mass of the concrete buildup within the drum, etc.). The buildup control system may be configured to generate at least one of (i) a notification indicating the longitudinal position of the concrete buildup within the drum or (ii) a control signal based on the longitudinal position. The buildup control signal may be used to control operation of the drum (e.g., whether the drum stops rotating until it is cleaned, etc.), or another component of the concrete mixer vehicle. In some embodiments, the buildup control signal may control an actuator for a tag axle (e.g., a drop axle, dead axle, etc.) of the concrete mixer vehicle that is used to modify the weight distribution of the mixer vehicle (e.g., an amount of weight applied to each axle of the concrete mixer vehicle, etc.). For example, the buildup control system may be configured to generate the control signal to lower the tag axle based on a determination that the longitudinal position associated with a given amount of concrete buildup exceeds a position threshold (e.g., a position at which 75% of the weight is distributed between rear axles of the vehicle, etc.).

According to another exemplary embodiment, a concrete mixer vehicle includes a drum assembly having a mixer drum, a drum drive system, and a drum control system. The drum control system may be configured to perform a calibration test while the mixer drum is empty and clean to determine a baseline operating characteristic (e.g., a baseline pressure, a baseline voltage, a baseline current, etc.) of the drum drive system. The drum control system may be further configured to perform a buildup detection test following use of the mixer drum, but while the mixer drum is emptied of its contents (e.g., all wet concrete has been discharged, etc.) to determine a current operating characteristic (e.g., a current pressure, a current voltage, a current amount of current draw, etc.) of the drum drive system. In some embodiments, the drum control system only performs the calibration test and/or the buildup detection test if a temperature of a fluid (e.g., hydraulic fluid, etc.) within the drum drive system is above a threshold fluid temperature. In some embodiments, the drum control system only performs the calibration test and/or the buildup detection test if a temperature of a drum motor is above a threshold motor temperature. After obtaining the current operating characteristic, the drum control system is configured to determine whether a difference between the baseline operating characteristic and the current operating characteristic exceeds a predefined threshold differential and, if so, provide a notification indicating that there is concrete buildup within the mixer drum.

In some embodiments, the buildup determination system is part of the drum control system and is configured to receive information/data from the drum control system. For example, the buildup control system may be configured to receive and interpret the operating characteristic from the drum control system, and use the operating characteristic to improve the calculation accuracy of the longitudinal position at which concrete buildup is located within the drum, as will be further described.

According to the exemplary embodiment shown in FIGS. 1-5, a vehicle, shown as concrete mixer truck 10, includes a drum assembly, shown as drum assembly 100, and a control system 150. According to an exemplary embodiment, the concrete mixer truck 10 is configured as a rear-discharge concrete mixer truck. In other embodiments, the concrete mixer truck 10 is configured as a front-discharge concrete mixer truck. As shown in FIG. 1, the concrete mixer truck 10 includes a chassis, shown as frame 12, and a cab, shown as cab 14, coupled to the frame 12 (e.g., at a front end thereof, etc.). The drum assembly 100 is coupled to the frame 12 and disposed behind the cab 14 (e.g., at a rear end thereof, etc.), according to the exemplary embodiment shown in FIG. 1. In other embodiments, at least a portion of the drum assembly 100 extends in front of the cab 14. The cab 14 may include various components to facilitate operation of the concrete mixer truck 10 by an operator (e.g., a seat, a steering wheel, hydraulic controls, a user interface, switches, buttons, dials, etc.).

Figure 3:
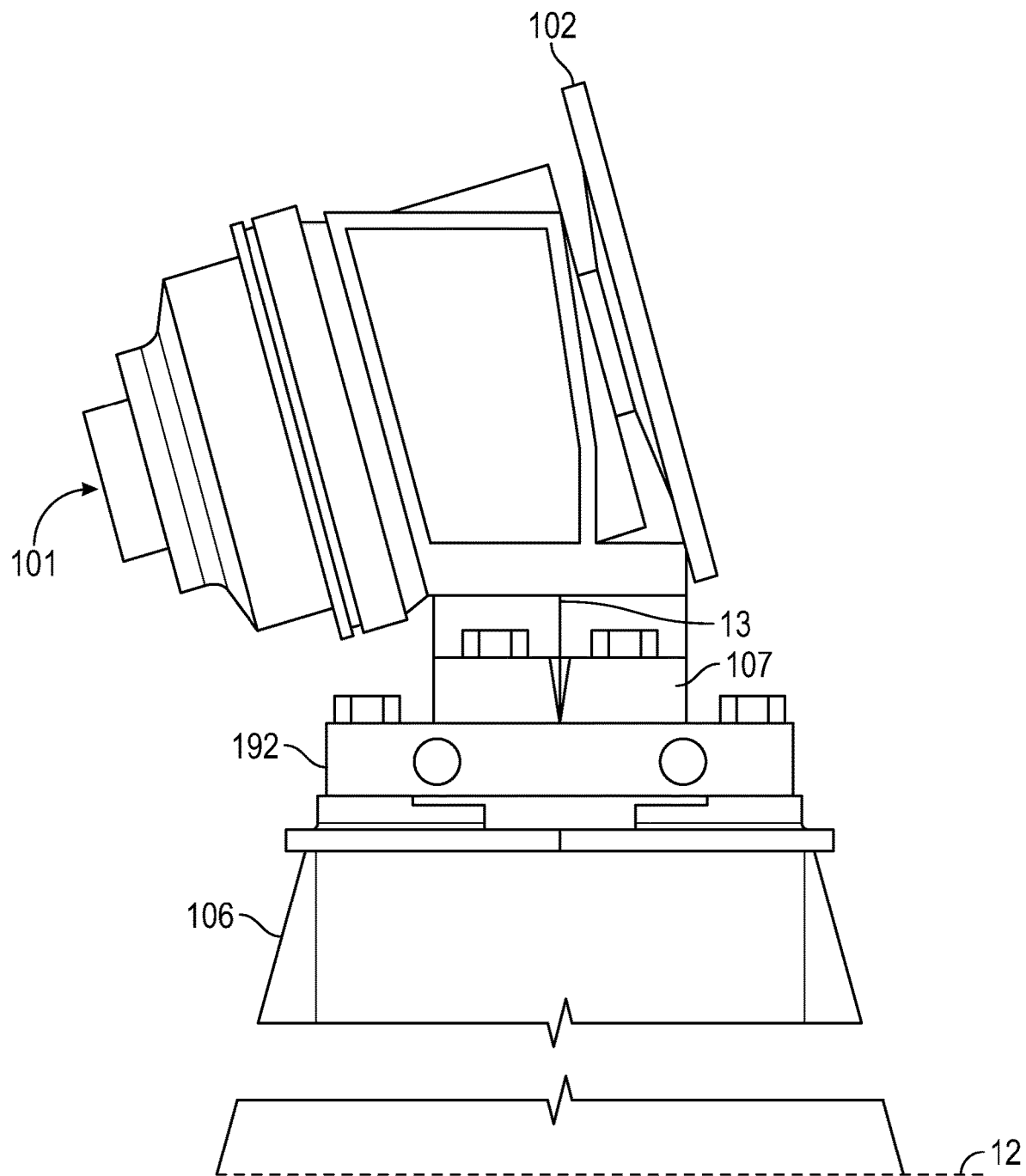
FIG. 3 is a schematic diagram of a drum drive system of the concrete mixer truck of FIG. 1, according to an exemplary embodiment.
Figure 4:
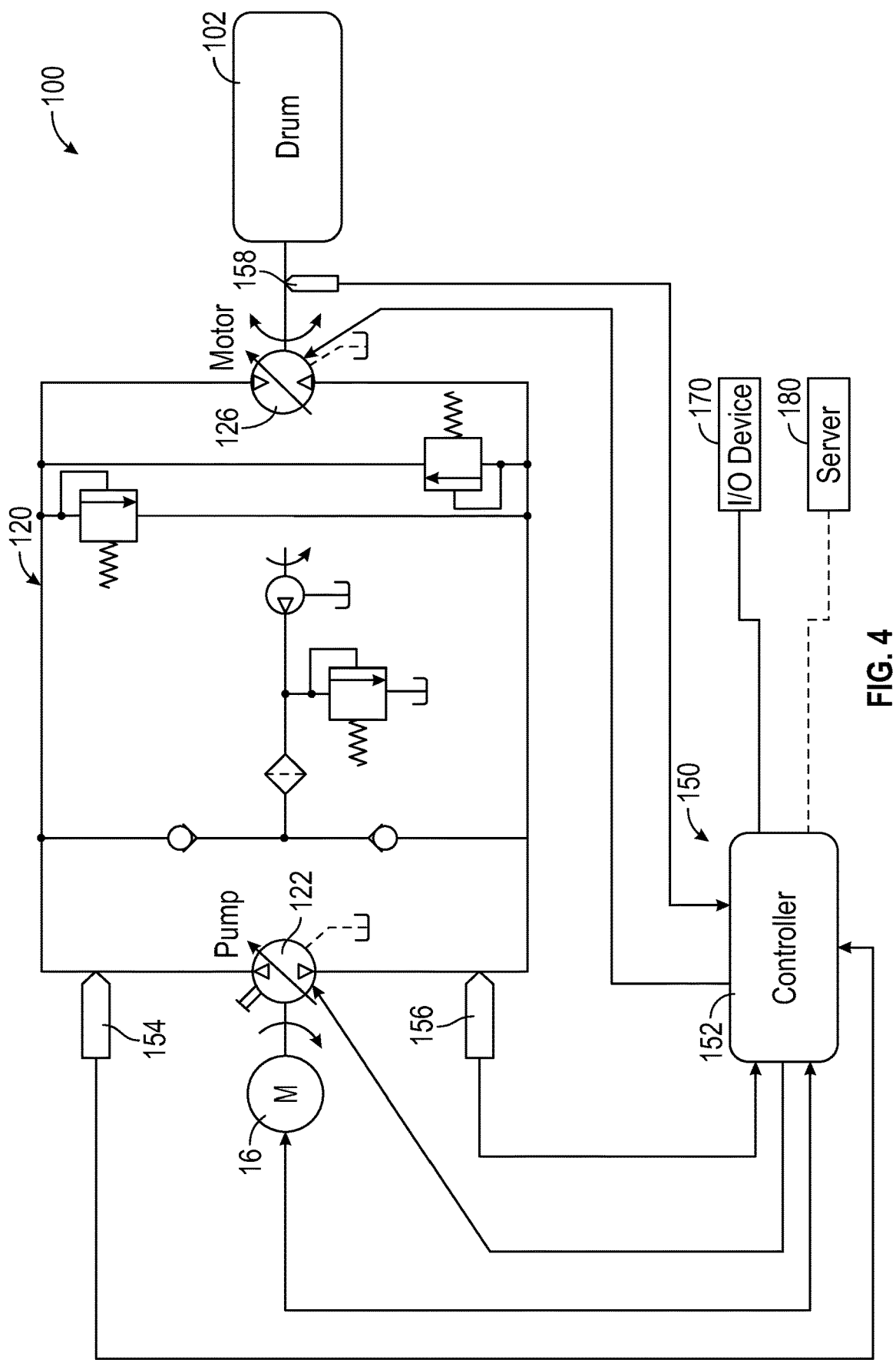
FIG. 4 is a power flow diagram for the concrete mixer truck of FIG. 1 having a drum drive system that is selectively coupled to a transmission with a clutch, according to an exemplary embodiment.
Figure 5:
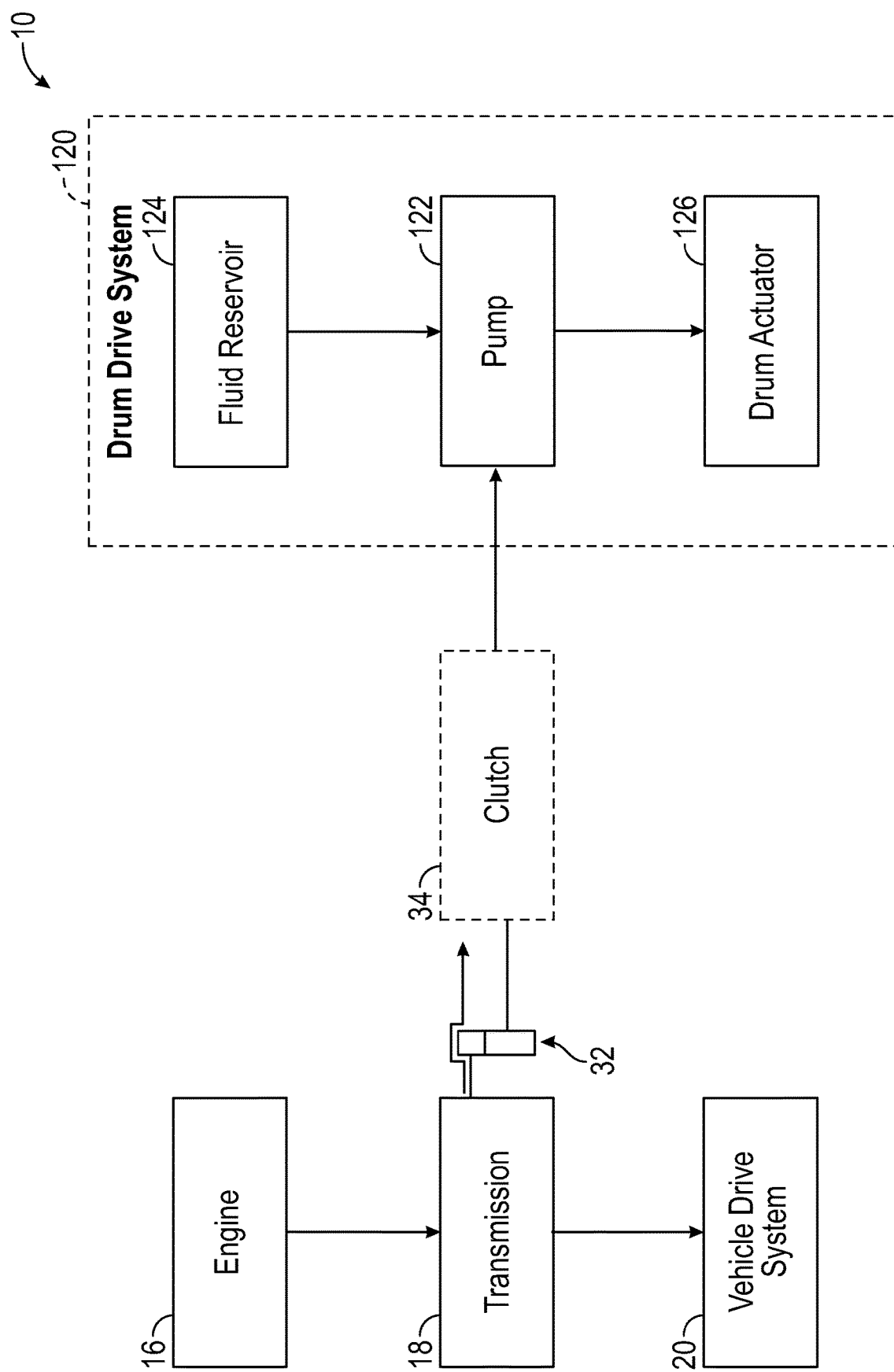
FIG. 5 is a schematic diagram of a drum drive system of the concrete mixer truck of FIG. 1, according to another exemplary embodiment.

As shown in FIGS. 1, 3, and 4, the concrete mixer truck 10 includes a prime mover, shown as engine 16. As shown in FIG. 1, the engine 16 is coupled to the frame 12 at a position beneath the cab 14. The engine 16 may be configured to utilize one or more of a variety of fuels (e.g., gasoline, diesel, bio-diesel, ethanol, natural gas, etc.), according to various exemplary embodiments. According to an alternative embodiment, as shown in FIG. 5 and described in more detail herein, the prime mover additionally or alternatively includes one or more electric motors and/or generators, which may be coupled to the frame 12 (e.g., a hybrid vehicle, an electric vehicle, etc.). The electric motors may consume electrical power from an on-board storage device (e.g., batteries, ultra-capacitors, etc.), from an on-board generator (e.g., an internal combustion engine, a genset, etc.), and/or from an external power source (e.g., overhead power lines, etc.) and provide power to systems of the concrete mixer truck 10.

As shown in FIGS. 1 and 4, the concrete mixer truck 10 includes a power transfer device, shown as transmission 18. In one embodiment, the engine 16 produces mechanical power (e.g., due to a combustion reaction, etc.) that flows into the transmission 18. As shown in FIGS. 1 and 4, the concrete mixer truck 10 includes a first drive system, shown as vehicle drive system 20, that is coupled to the transmission 18. The vehicle drive system 20 may include drive shafts, differentials, and other components coupling the transmission 18 with a ground surface to move the concrete mixer truck 10. As shown in FIG. 1, the concrete mixer truck 10 includes a plurality of axles 21, each including a plurality of tractive elements, shown as wheels 22, that engage a ground surface to move the concrete mixer truck 10. In one embodiment, at least a portion of the mechanical power produced by the engine 16 flows through the transmission 18 and into the vehicle drive system 20 to power at least a portion of the wheels 22 (e.g., front wheels, rear wheels, etc.). In one embodiment, energy (e.g., mechanical energy, etc.) flows along a first power path defined from the engine 16, through the transmission 18, and to the vehicle drive system 20. As shown in FIG. 1, the concrete mixer truck 10 includes three separate axles, each including a pair of tractive elements. In other embodiments, the concrete mixer truck 10 may include more or fewer axles. According to an exemplary embodiments, at least one of the plurality of axles 21 is a tag axle 133 (e.g., a drop axle, spare axle, etc.), configured to provide additional support to the frame 12 in certain situations (e.g., challenging terrain, hazardous road conditions, increased load conditions, etc.). In some embodiments, the tag axle 133 is repositionable between a raised position, in which the tag axle 133 is separated from a ground surface, and a lowered position, in which the tag axle 133 is lowered into contact with the ground surface. Among other benefits, the tag axle 133 may also adjust the weight distribution of the vehicle 10, between different axles 21 (e.g., toward a front of the vehicle 10, toward a rear of the vehicle 10, etc.).

Figure 2:
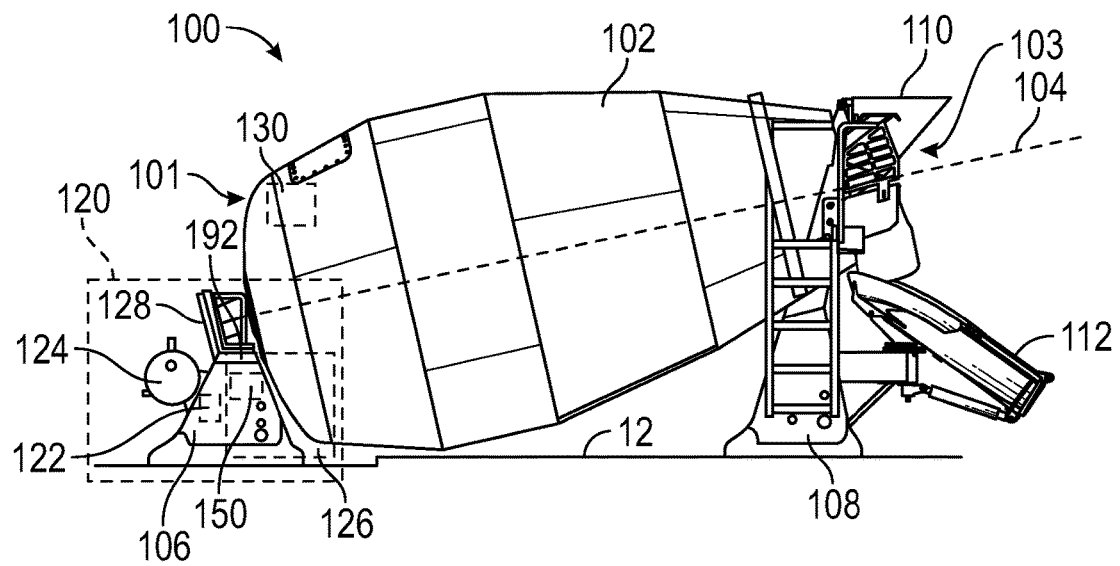
FIG. 2 is a detailed side view of the drum assembly of the concrete mixer truck of FIG. 1, according to an exemplary embodiment.

As shown in FIGS. 1-3 and 5, the drum assembly 100 of the concrete mixer truck 10 includes a drum, shown as mixer drum 102. The mixer drum 102 is coupled to the frame 12 and disposed behind the cab 14 (e.g., at a rear and/or middle of the frame 12, etc.). As shown in FIGS. 1-5, the drum assembly 100 includes a second drive system, shown as drum drive system 120, that is coupled to the frame 12. As shown in FIGS. 1 and 2, the concrete mixer truck 10 includes a first support, shown as front pedestal 106, and a second support, shown as rear pedestal 108. According to an exemplary embodiment, the front pedestal 106 and the rear pedestal 108 cooperatively couple (e.g., attach, secure, etc.) the mixer drum 102 to the frame 12 and facilitate rotation of the mixer drum 102 relative to the frame 12. As shown in FIGS. 1 and 2, the front pedestal 106 is disposed proximate to a forward end 101 of the mixer drum 102, between the forward end 101 of the mixer drum 102 and the frame 12. The rear pedestal 108 is disposed proximate to a rear end 103 of the mixer drum 102, between the rear end 103 and the frame 12. In an alternative embodiment, the drum assembly 100 is configured as a stand-alone mixer drum that is not coupled (e.g., fixed, attached, etc.) to a vehicle. In such an embodiment, the drum assembly 100 may be mounted to a stand-alone frame. The stand-alone frame may be a chassis including wheels that assist with the positioning of the stand-alone mixer drum on a worksite. Such a stand-alone mixer drum may also be detachably coupled to and/or capable of being loaded onto a vehicle such that the stand-alone mixer drum may be transported by the vehicle.

According to an exemplary embodiment, the concrete mixer truck 10 further includes a load detection system 190 configured to monitor a portion of the force applied by the mixer drum 102 to the frame 12. As shown in FIGS. 1-2, the load detection system 190 includes a load sensor 192 positioned between the mixer drum 102 and the frame 12 proximate to a forward end 101 of the mixer drum 102. More specifically, the load sensor 192 is coupled to the front pedestal 106, between an upper surface of the front pedestal 106 and the mixer drum 102, such that the load sensor 192 monitors the weight at the forward end 101 of the mixer drum 102. In other embodiments, the load sensor 192 is positioned proximate to a rear end 103 of the mixer drum 102 (e.g., to the rear pedestal 108, between an upper surface of the rear pedestal 106 and the mixer drum 102, such that the load sensor 192 monitors the weight at the rear end 103 of the mixer drum 102, etc.). In yet other embodiments, the load sensor 192 is positioned at another location along the mixer drum 102.

As shown in FIG. 3, the load sensor 192 is a plate-type load cell (e.g., plate load cell, scale, etc.) that is shaped as rectangular plate. The load cell is configured to monitor a force 13 that is applied vertically downward toward frame 12 (e.g., parallel to a gravity direction, etc.) The load sensor 192 is bolted or otherwise fastened directly to the upper surface of the front pedestal 106. In other embodiments, the load sensor 192 may be another type of load cell configured to support the weight of at least one end of the mixer drum 102. As shown in FIG. 3, the load sensor 192 is "sandwiched" or otherwise disposed between a mounting member 107 for the forward end 101 of the mixer drum 102 and the upper surface of the front pedestal 106. In other embodiments, the load cell may be mounted to a lower end of the front pedestal 106, between the front pedestal 106 and the frame 12, or at an intermediate position between different portions of the front pedestal 106 or rear pedestal 108 (see FIG. 1). In yet other embodiments, the load cell may be positioned under the rollers for the mixer drum 102 (e.g., roller assemblies forward or aft of the mixer drum 102, drum roller, etc.). In yet other embodiments, the load cell may be positioned in center pins of the roller assemblies for the mixer drum 102 or integrated into other components of the roller assemblies for the mixer drum 102.

As shown in FIGS. 1 and 2, the mixer drum 102 defines a central, longitudinal axis, shown as axis 104. According to an exemplary embodiment, the drum drive system 120 is configured to selectively rotate the mixer drum 102 about the axis 104. As shown in FIGS. 1 and 2, the axis 104 is angled relative to the frame 12 such that the axis 104 intersects with the frame 12. According to an exemplary embodiment, the axis 104 is elevated from the frame 12 at an angle in the range of five degrees to twenty degrees. In other embodiments, the axis 104 is elevated by less than five degrees (e.g., four degrees, three degrees, etc.) or greater than twenty degrees (e.g., twenty-five degrees, thirty degrees, etc.). In an alternative embodiment, the concrete mixer truck 10 includes an actuator positioned to facilitate selectively adjusting the axis 104 to a desired or target angle (e.g., manually in response to an operator input/command, automatically according to a control scheme, etc.).

As shown in FIGS. 1 and 2, the mixer drum 102 of the drum assembly 100 includes an inlet, shown as hopper 110, and an outlet, shown as chute 112. According to an exemplary embodiment, the mixer drum 102 is configured to receive a mixture, such as a concrete mixture (e.g., cementitious material, aggregate, sand, etc.), with the hopper 110. The mixer drum 102 may include a mixing element (e.g., fins, etc.) positioned within the interior thereof. The mixing element may be configured to (i) agitate the contents of mixture within the mixer drum 102 when the mixer drum 102 is rotated by the drum drive system 120 in a first direction (e.g., counterclockwise, clockwise, etc.) and (ii) drive the mixture within the mixer drum 102 out through the chute 112 when the mixer drum 102 is rotated by the drum drive system 120 in an opposing second direction (e.g., clockwise, counterclockwise, etc.).

According to the exemplary embodiment shown in FIG. 2, and FIGS. 4-5, the drum drive system is a hydraulic drum drive system. As shown in FIG. 2, and FIGS. 4-5, the drum drive system 120 includes a pump, shown as pump 122; a reservoir, shown as fluid reservoir 124, fluidly coupled to the pump 122; and an actuator, shown as drum motor 126. As shown in FIGS. 4 and 5, the pump 122 and the drum motor 126 are fluidly coupled. According to an exemplary embodiment, the drum motor 126 is a hydraulic motor, the fluid reservoir 124 is a hydraulic fluid reservoir, and the pump 122 is a hydraulic pump. The pump 122 may be configured to pump fluid (e.g., hydraulic fluid, etc.) stored within the fluid reservoir 124 to drive the drum motor 126. In other embodiments, the drum drive system may include another form of driver or mover to control rotation of the drum (e.g., electric motor, etc.), as will be further described.

According to an exemplary embodiment, the pump 122 is a variable displacement hydraulic pump (e.g., an axial piston pump, etc.) and has a pump stroke that is variable. The pump 122 may be configured to provide hydraulic fluid at a flow rate that varies based on the pump stroke (e.g., the greater the pump stroke, the greater the flow rate provided to the drum motor 126, etc.). The pressure of the hydraulic fluid provided by the pump 122 may also increase in response to an increase in pump stroke (e.g., where pressure may be directly related to work load, higher flow may result in higher pressure, etc.). The pressure of the hydraulic fluid provided by the pump 122 may alternatively not increase in response to an increase in pump stroke (e.g., in instances where there is little or no work load, etc.). The pump 122 may include a throttling element (e.g., a swash plate, etc.). The pump stroke of the pump 122 may vary based on the orientation of the throttling element. In one embodiment, the pump stroke of the pump 122 varies based on an angle of the throttling element (e.g., relative to an axis along which the pistons move within the axial piston pump, etc.). By way of example, the pump stroke may be zero where the angle of the throttling element is equal to zero. The pump stroke may increase as the angle of the throttling element increases. According to an exemplary embodiment, the variable pump stroke of the pump 122 provides a variable speed range of up to about 10:1. In other embodiments, the pump 122 is configured to provide a different speed range (e.g., greater than 10:1, less than 10:1, etc.).

In one embodiment, the throttling element of the pump 122 is movable between a stroked position (e.g., a maximum stroke position, a partially stroked position, etc.) and a destroked position (e.g., a minimum stroke position, a partially destroked position, etc.). According to an exemplary embodiment, an actuator is coupled to the throttling element of the pump 122. The actuator may be positioned to move the throttling element between the stroked position and the destroked position. In some embodiments, the pump 122 is configured to provide no flow, with the throttling element in a non-stroked position, in a default condition (e.g., in response to not receiving a stroke command, etc.). The throttling element may be biased into the non-stroked position. In some embodiments, the control system 150 (e.g., buildup control system, drum control system, etc.) is configured to provide a first command signal. In response to receiving the first command signal, the pump 122 (e.g., the throttling element by the actuator thereof, etc.) may be selectively reconfigured into a first stroke position (e.g., stroke in one direction, a destroked position, etc.). In some embodiments, the control system 150 is configured to additionally or alternatively provide a second command signal. In response to receiving the second command signal, the pump 122 (e.g., the throttling element by the actuator thereof, etc.) may be selectively reconfigured into a second stroke position (e.g., stroke in an opposing second direction, a stroked position, etc.). The pump stroke may be related to the position of the throttling element and/or the actuator.

According to another exemplary embodiment, a valve is positioned to facilitate movement of the throttling element between the stroked position and the destroked position. In one embodiment, the valve includes a resilient member (e.g., a spring, etc.) configured to bias the throttling element in the destroked position (e.g., by biasing movable elements of the valve into positions where a hydraulic circuit actuates the throttling element into the destroked positions, etc.). Pressure from fluid flowing through the pump 122 may overcome the resilient member to actuate the throttling element into the stroked position (e.g., by actuating movable elements of the valve into positions where a hydraulic circuit actuates the throttling element into the stroked position, etc.).

As shown in FIG. 5, the concrete mixer truck 10 includes a power takeoff unit, shown as power takeoff unit 32, that is coupled to the transmission 18. In another embodiment, the power takeoff unit 32 is coupled directly to the engine 16. In one embodiment, the transmission 18 and the power takeoff unit 32 include mating gears that are in meshing engagement. A portion of the energy provided to the transmission 18 flows through the mating gears and into the power takeoff unit 32, according to an exemplary embodiment. In one embodiment, the mating gears have the same effective diameter. In other embodiments, at least one of the mating gears has a larger diameter, thereby providing a gear reduction or a torque multiplication and increasing or decreasing the gear speed.

As shown in FIG. 5, the power takeoff unit 32 is selectively coupled to the pump 122 with a clutch 34. In other embodiments, the power takeoff unit 32 is directly coupled to the pump 122 (e.g., without clutch 34, etc.). In some embodiments, the concrete mixer truck 10 does not include the clutch 34. By way of example, the power takeoff unit 32 may be directly coupled to the pump 122 (e.g., a direct configuration, a non-clutched configuration, etc.). According to an alternative embodiment, the power takeoff unit 32 includes the clutch 34 (e.g., a hot shift PTO, etc.). In one embodiment, the clutch 34 includes a plurality of clutch discs. When the clutch 34 is engaged, an actuator forces the plurality of clutch discs into contact with one another, which couples an output of the transmission 18 with the pump 122. In one embodiment, the actuator includes a solenoid that is electronically actuated according to a clutch control strategy. When the clutch 34 is disengaged, the pump 122 is not coupled to (i.e., is isolated from) the output of the transmission 18. Relative movement between the clutch discs or movement between the clutch discs and another component of the power takeoff unit 32 may be used to decouple the pump 122 from the transmission 18.

In one embodiment, energy flows along a second power path defined from the engine 16, through the transmission 18 and the power takeoff unit 32, and into the pump 122 when the clutch 34 is engaged. When the clutch 34 is disengaged, energy flows from the engine 16, through the transmission 18, and into the power takeoff unit 32. The clutch 34 selectively couples the pump 122 to the engine 16, according to an exemplary embodiment. In one embodiment, energy along the first flow path is used to drive the wheels 22 of the concrete mixer truck 10, and energy along the second flow path is used to operate the drum drive system 120 (e.g., power the pump 122, etc.). By way of example, the clutch 34 may be engaged such that energy flows along the second flow path when the pump 122 is used to provide hydraulic fluid to the drum motor 126. When the pump 122 is not used to drive the mixer drum 102 (e.g., when the mixer drum 102 is empty, etc.), the clutch 34 may be selectively disengaged, thereby conserving energy. In embodiments without clutch 34, the mixer drum 102 may continue turning (e.g., at low speed) when empty.

The drum motor 126 is positioned to drive the rotation of the mixer drum 102. In some embodiments, the drum motor 126 is a fixed displacement motor. In some embodiments, the drum motor 126 is a variable displacement motor. In one embodiment, the drum motor 126 operates within a variable speed range up to about 3:1 or 4:1. In other embodiments, the drum motor 126 is configured to provide a different speed range (e.g., greater than 4:1, less than 3:1, etc.). According to an exemplary embodiment, the speed range of the drum drive system 120 is the product of the speed range of the pump 122 and the speed range of the drum motor 126. The drum drive system 120 having a variable pump 122 and a variable drum motor 126 may thereby have a speed range that reaches up to 30:1 or 40:1 (e.g., without having to operate the engine 16 at a high idle condition, etc.). According to an exemplary embodiment, increased speed range of the drum drive system 120 having a variable displacement motor and a variable displacement pump relative to a drum drive system having a fixed displacement motor frees up boundary limits for the engine 16, the pump 122, and the drum motor 126. Advantageously, with the increased capacity of the drum drive system 120, the engine 16 does not have to run at either high idle or low idle during the various operating modes of the drum assembly 100 (e.g., mixing mode, discharging mode, filling mode, etc.), but rather the engine 16 may be operated at a speed that provides the most fuel efficiency and most stable torque. Also, the pump 122 and the drum motor 126 may not have to be operated at displacement extremes to meet the speed requirements for the mixer drum 102 during various applications, but can rather be modulated to the most efficient working conditions (e.g., by the system 150, etc.).

As shown in FIG. 2, the drum drive system 120 includes a drive mechanism, shown as drum drive wheel 128, coupled to the mixer drum 102. The drum drive wheel 128 may be welded, bolted, or otherwise secured to the head of the mixer drum 102. The center of the drum drive wheel 128 may be positioned along the axis 104 such that the drum drive wheel 128 rotates about the axis 104. According to an exemplary embodiment, the drum motor 126 is coupled to the drum drive wheel 128 (e.g., with a belt, a chain, a gearing arrangement, etc.) to facilitate driving the drum drive wheel 128 and thereby rotate the mixer drum 102. The drum drive wheel 128 may be or include a sprocket, a cogged wheel, a grooved wheel, a smooth-sided wheel, a sheave, a pulley, or still another member. In other embodiments, the drum drive system 120 does not include the drum drive wheel 128. By way of example, the drum drive system 120 may include a gearbox that couples the drum motor 126 to the mixer drum 102. By way of another example, the drum motor 126 (e.g., an output thereof, etc.) may be directly coupled to the mixer drum 102 (e.g., along the axis 104, etc.) to rotate the mixer drum 102.

Figure 6:
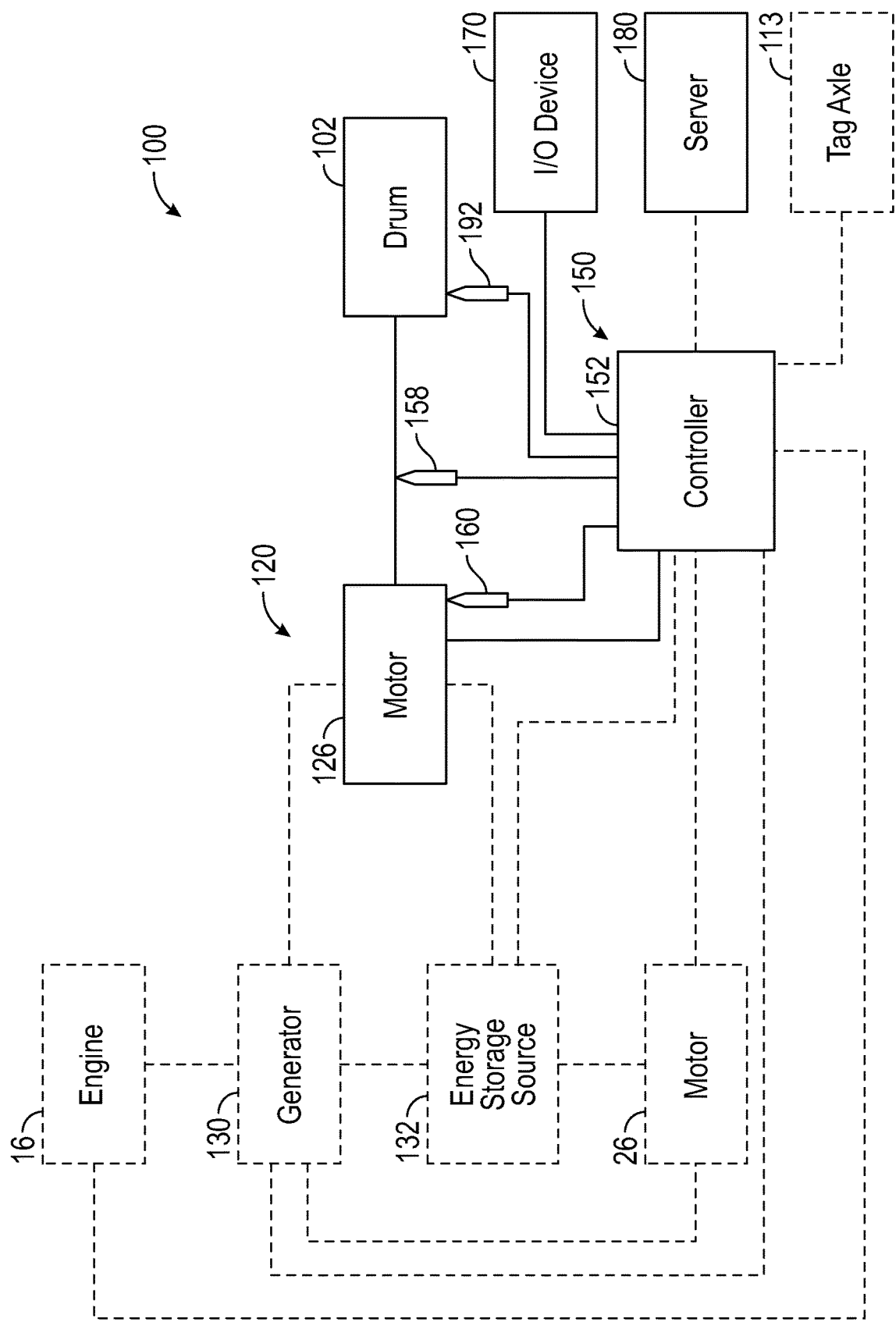
FIG. 6 is a first graphical user interface provided by an interface of the concrete mixer truck of FIG. 1, according to an exemplary embodiment.

According to the exemplary embodiment shown in FIG. 6, the drum drive system 120 of the drum assembly 100 is configured to be an electric drum drive system. As shown in FIG. 6, the drum drive system 120 includes the drum motor 126, which is electrically powered to drive the mixer drum 102. By way of example, in an embodiment where the concrete mixer truck 10 has a hybrid powertrain, the engine 16 may drive a generator (e.g., with the power takeoff unit 32, etc.), shown as generator 130, to generate electrical power that is (i) stored for future use by the drum motor 126 in storage (e.g., battery cells, etc.), shown as energy storage source 132, and/or (ii) provided directly to drum motor 126 to drive the mixer drum 102. The energy storage source 132 may additionally be chargeable using a mains power connection (e.g., through a charging station, etc.). By way of another example, in an embodiment where the concrete mixer truck 10 has an electric powertrain, the engine 16 may be replaced with a main motor, shown as primary motor 26, that drives the wheels 22. The primary motor 26 and the drum motor 126 may be powered by the energy storage source 132 and/or the generator 130 (e.g., a regenerative braking system, etc.).

According to the exemplary embodiments shown in FIGS. 4 and 6, the control system 150 for the drum assembly 100 of the concrete mixer truck 10 includes a controller 152 (e.g., concrete buildup controller, drum assembly controller, etc.). In one embodiment, the controller 152 is configured to selectively engage, selectively disengage, control, and/or otherwise communicate with components of the drum assembly 100, the load detection system 190, and/or the concrete mixer truck 10 (e.g., actively control the components thereof, etc.). As shown in FIGS. 4 and 6, the controller 152 is coupled to the engine 16, the primary motor 26, the pump 122, the drum motor 126, the generator 130, the energy storage source 132, a tag axle 133, a pressure sensor 154, a temperature sensor 156, a speed sensor 158, a motor sensor 160, a load sensor 192, an input/output ("I/O") device 170, and/or a remote server 180. In other embodiments, the controller 152 is coupled to more or fewer components. By way of example, the controller 152 may send and/or receive signals with the engine 16, the primary motor 26, the pump 122, the drum motor 126, the generator 130, the energy storage source 132, the tag axle 133, the pressure sensor 154, the temperature sensor 156, the speed sensor 158, the motor sensor 160, the load sensor 192, the I/O device 170, and/or the remote server 180. In some embodiments, the functions of the control system 150 described herein may be performed by the remote server 180 or the control system 150 and the remote server 180 in combination (e.g., the control system 150 gathers and transmits data to the remote server 180, which then subsequently performs the data analytics described herein, etc.). By way of example, components of the control system 150 may be positioned locally on the concrete mixer truck 10. By way of another example, components of the control system 150 may be positioned remotely from the concrete mixer truck 10 (e.g., on the remote server 180, etc.). By way of yet example, components of the control system 150 may be positioned locally on the concrete mixer truck 10 and remotely from the concrete mixer truck 10.

The controller 152 may be implemented as hydraulic controls, a general-purpose processor, an application specific integrated circuit (ASIC), one or more field programmable gate arrays (FPGAs), a digital-signal-processor (DSP), circuits containing one or more processing components, circuitry for supporting a microprocessor, a group of processing components, or other suitable electronic processing components. According to an exemplary embodiment, the controller 152 includes a processing circuit having a processor and a memory. The processing circuit may include an ASIC, one or more FPGAs, a DSP, circuits containing one or more processing components, circuitry for supporting a microprocessor, a group of processing components, or other suitable electronic processing components. In some embodiments, the processor is configured to execute computer code stored in the memory to facilitate the activities described herein. The memory may be any volatile or non-volatile computer-readable storage medium capable of storing data or computer code relating to the activities described herein. According to an exemplary embodiment, the memory includes computer code modules (e.g., executable code, object code, source code, script code, machine code, etc.) configured for execution by the processor.

According to an exemplary embodiment, the controller 152 is configured to facilitate detecting the buildup of concrete within the mixer drum 102, and at least one characteristic associated with the concrete buildup. For example, the controller 152 may be configured to determine a longitudinal position, between the forward end 101 and the rear end 103 of the mixer drum 102, at which the concrete buildup is located (e.g., at which the center of mass of the concrete buildup is located, etc.).

By way of example, over time after various concrete discharge cycles, concrete may begin to build up and harden within the mixer drum 102. Such buildup is disadvantageous because of the increased weight of the concrete mixer truck 10 and decreased charge capacity of the mixer drum 102. Such factors may reduce the efficiency of concrete delivery. The position of the concrete buildup within the mixer drum 102 may also impact vehicle performance. For example, in some instances, and depending on loading/unloading frequency, and other factors, the concrete buildup may deposit toward only one end of the mixer drum 102 (e.g., the forward end 101 or the rear end 103). This uneven distribution of concrete buildup within the mixer drum 102 can alter the load distribution between the front and rear end of the concrete mixer vehicle 10. This can cause issues with maneuverability, or result in highly localized loading along a single axle (e.g., one of the rear axles) that exceeds maximum thresholds (e.g., gravimetric weight limits imposed by the government). For at least the reasons, the concrete that has built up must be cleaned from the interior of the mixer drum 102 (i.e., using a chipping process), or other actions must be taken to redistribute the mass to different parts of the concrete mixer vehicle 10. Typically, the buildup is monitored either (i) manually by the operator of the concrete mixer truck 10 (e.g., by inspecting the interior of the mixer drum 102, etc.) or (ii) using expensive load cells to detect a change in mass of the mixer drum 102 when empty. According to an exemplary embodiment, the controller 152 is configured to automatically detect concrete buildup within the mixer drum 102 and the approximate longitudinal position of the concrete buildup using sensor measurements from more cost effective sensors and processes.

According to an exemplary embodiment, the controller 152 is configured to facilitate implementing or initiating a calibration test to identify baseline performance of the drum drive system 120 when the mixer drum 102 is clean and free of buildup (e.g., the concrete mixer truck 10 is brand new, after the mixer drum 102 has been cleaned/chipped out completely, etc.). After one or more uses of the mixer drum 102 and while the mixer drum 102 is empty, the controller 152 is configured to facilitate implementing or initiating a buildup detection test to reevaluate the performance of the drum drive system 120 relative the baseline identified during the calibration test and determine if concrete buildup is present and/or sufficient enough to warrant notifying the operator.

Figure 7:
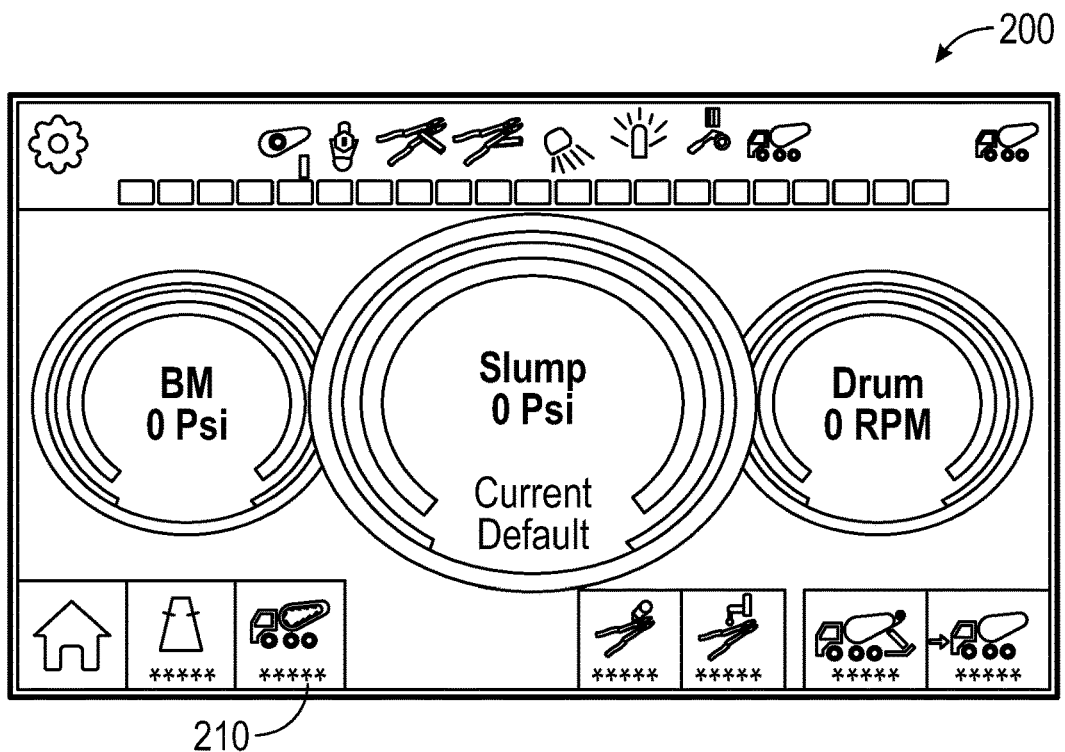
FIG. 7 is a second graphical user interface provided by an interface of the concrete mixer truck of FIG. 1, according to an exemplary embodiment.

As shown in FIG. 7, a first graphical user interface, shown as home GUI 200, may be displayed to an operator of the concrete mixer truck 10 by the I/O device 170. To access the buildup detection features, the operator may select a button of the home GUI 200, shown as buildup button 210. Selecting buildup button 210 may direct the operator to a second graphical user interface, shown as buildup GUI 300, as shown in FIG. 8.

Figure 8:
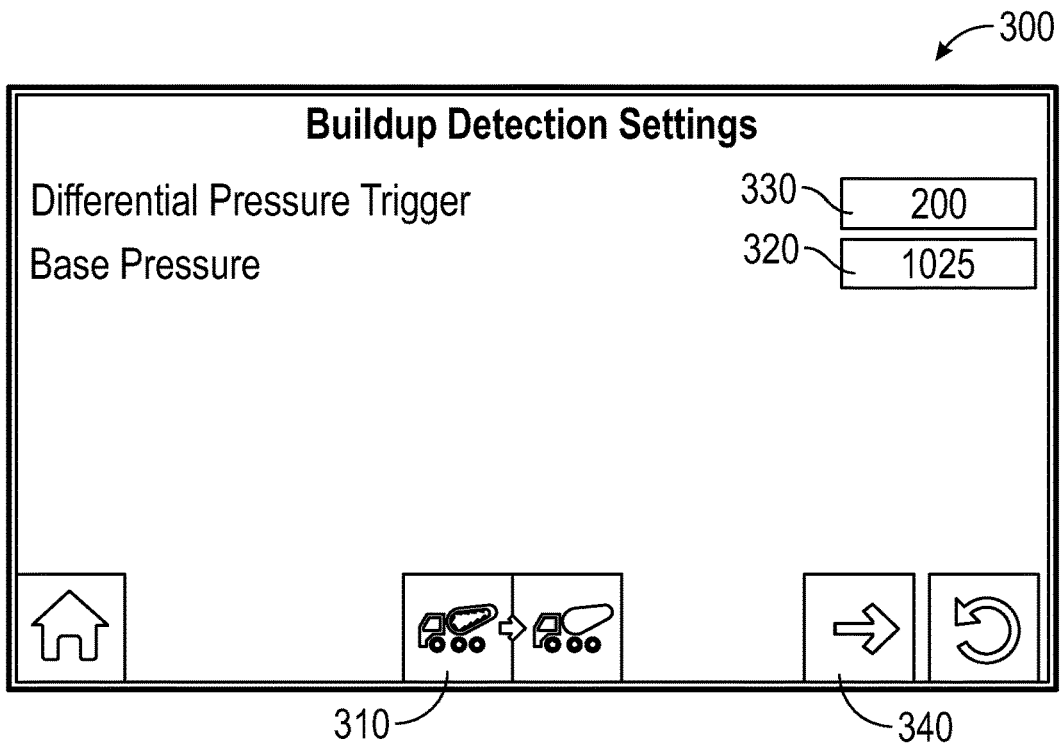
FIG. 8 is a graph illustrating a calibration test performed by the drum drive systems of FIGS. 3 and 5, according to an exemplary embodiment.

As shown in FIG. 8, the buildup GUI 300 includes a first button, shown as calibration button 310, a first box, shown as baseline box 320, a second box, shown as threshold differential box 330, and a second button, shown as buildup detection button 340. According to an exemplary embodiment, selecting the calibration button 310 initiates the calibration test, selecting the buildup detection button 340 initiates the buildup detection test, the baseline box 320 displays a baseline operating characteristic regarding operation of the drum drive system 120 that is recorded as a result of performing the calibration test (e.g., hydraulic fluid pressure, motor voltage, motor current draw, etc.), and the threshold differential box 330 displays a threshold differential that a current operating characteristic of the drum drive system 120 is permitted to deviate from the baseline operating characteristics before concrete buildup is treated as sufficient to require action to be taken (e.g., chip out the mixer drum 102, notify the operator, and/or redistribute load to different parts of the vehicle via a dead axle, tag axle, etc.). In some embodiments, the threshold differential is preset by a manufacturer of the concrete mixer truck 10 (e.g., based on the configuration, model, capacity, etc. of the concrete mixer truck 10). In some embodiments, the threshold differential is selectively adjustable (e.g., set, determined, etc.) by the operator of the concrete mixer truck 10 (e.g., based on preferences, company policy, etc.).

Figure 9:
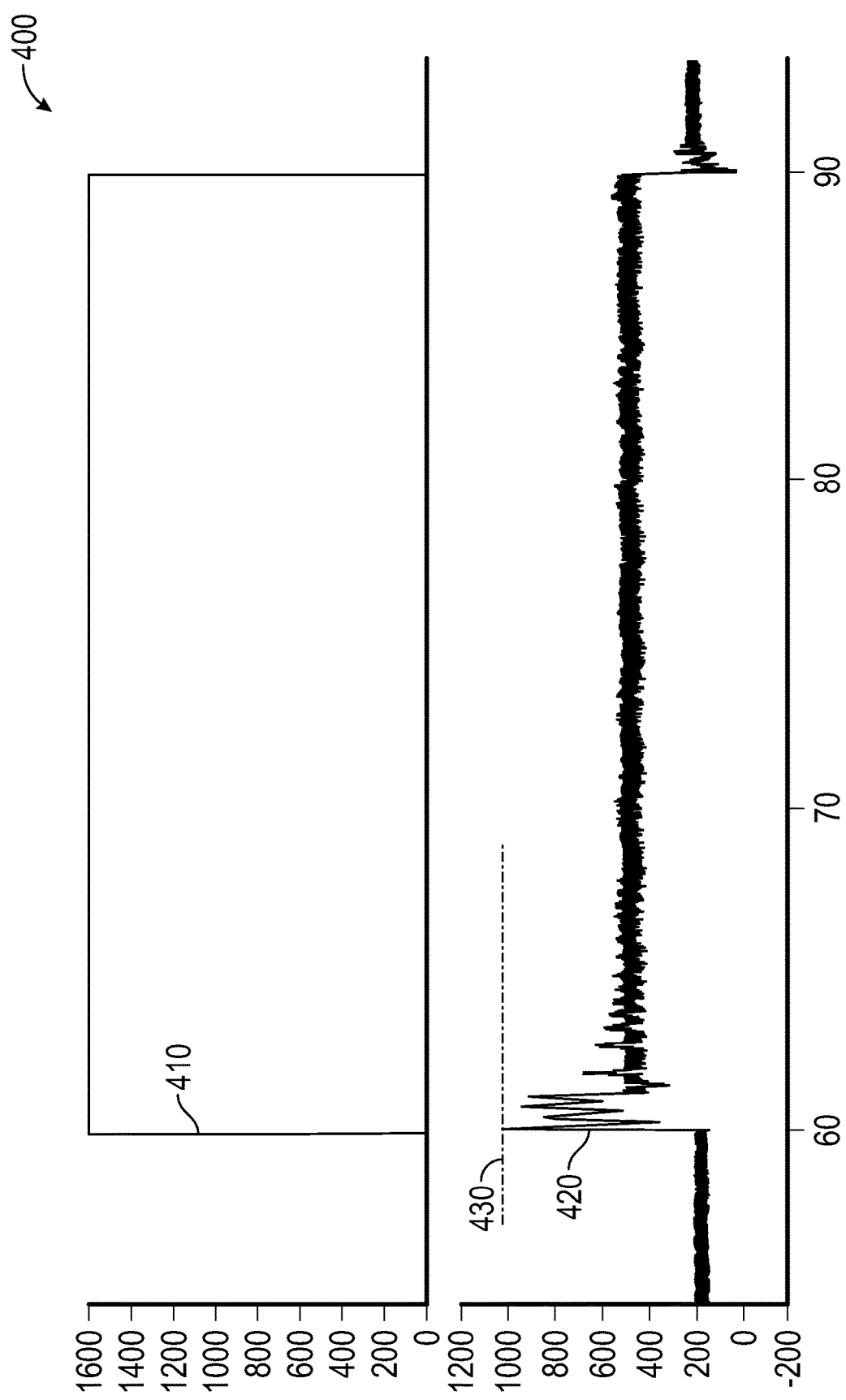
FIG. 9 is a graph illustrating a buildup detection test performed by the drum drive systems of FIGS. 3 and 5, according to an exemplary embodiment.

As shown in FIG. 9, a first graph, shown as calibration graph 400, illustrates the calibration test that is performed by the controller 152 on the drum drive system 120 (e.g., in response to the operator selecting the calibration button 310, etc.). According to an exemplary embodiment, the controller 152 is configured to initiate the calibration test by applying a step input 410 to the drum drive system 120 to quickly spin up the mixer drum 102 (e.g., to a max speed thereof, etc.). By way of example, in a hydraulic drum drive system embodiment, the controller 152 may be configured to provide the step input 410 to the pump 122 to maximize the flow of hydraulic fluid provided to the drum motor 126 and, thereby, drive the mixer drum 102 at a high speed. By way of another example, in an electric drum drive system, the controller 152 may be configured to provide the step input 410 to the drum motor 126 to drive the mixer drum 102 at the high speed. Following the application of the step input 410, the controller 152 is configured to monitor an operating characteristic response 420 of the drum drive system 120 and determine a peak or maximum value of the operating characteristic response 420, shown as baseline operating characteristic 430. By way of example, in a hydraulic drum drive system embodiment, the baseline operating characteristic 430 may be a peak pressure of the fluid at the outlet of the pump 122 measured by the pressure sensor 154 (e.g., in this example approximately 1025 psi, etc.). By way of another example, in an electric drum drive system embodiment, the baseline operating characteristic 430 may be a peak voltage and/or a peak current of the drum motor 126 measured by the motor sensor 160. The controller 152 may be configured to record the baseline operating characteristic 430 and populate baseline box 320 with the recorded baseline operating characteristic 430.

Figure 10:
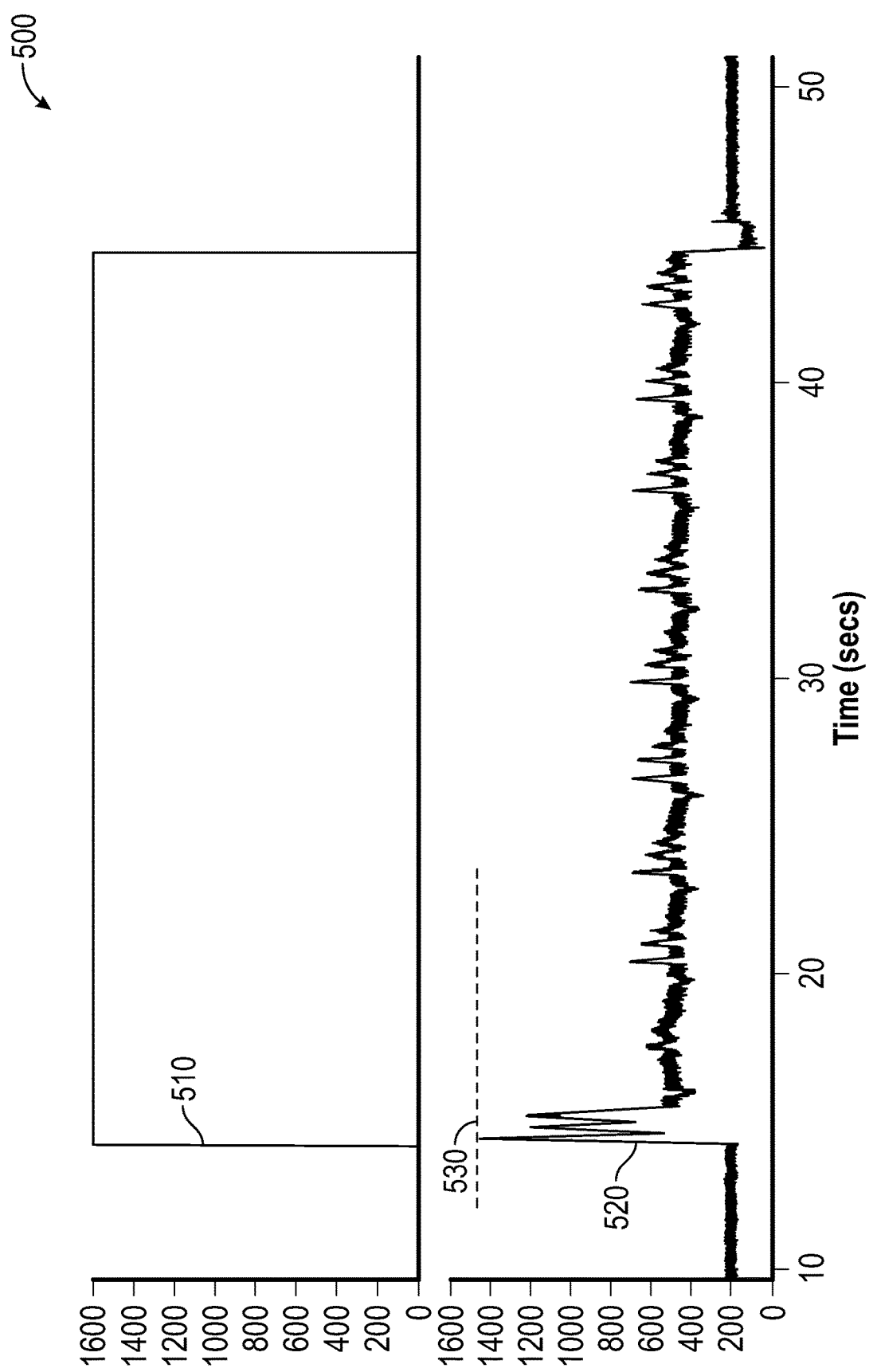
FIG. 10 is a first notification provided by the drum drive systems of FIGS. 3 and 5, according to an exemplary embodiment.

As shown in FIG. 10, a second graph, shown as buildup detection graph 500, illustrates the buildup detection test that is performed by the controller 152 on the drum drive system 120 (e.g., in response to the operator selecting the buildup detection button 340, etc.). According to an exemplary embodiment, the controller 152 is configured to initiate the buildup detection test by applying a step input 510 to the drum drive system 120 to quickly spin up the mixer drum 102 (e.g., to a max speed thereof, etc.). By way of example, in a hydraulic drum drive system embodiment, the controller 152 may be configured to provide the step input 510 to the pump 122 to maximize the flow of hydraulic fluid provided to the drum motor 126 and, thereby, drive the mixer drum 102 at a high speed. By way of another example, in an electric drum drive system, the controller 152 may be configured to provide the step input 510 to the drum motor 126 to drive the mixer drum 102 at the high speed. According to an exemplary embodiment, the step input 510 of the buildup detection test is the same as the step input 410 of the calibration test. Following the application of the step input 510, the controller 152 is configured to monitor an operating characteristic response 520 of the drum drive system 120 and determine a peak or maximum value of the operating characteristic response 520, shown as current operating characteristic 530. By way of example, in a hydraulic drum drive system embodiment, the current operating characteristic 530 may be a peak pressure of the fluid at the outlet of the pump 122 measured by the pressure sensor 154 (e.g., in this example approximately 1450 psi, etc.). By way of another example, in an electric drum drive system embodiment, the current operating characteristic 530 may be a peak voltage and/or a peak current of the drum motor 126 measured by the motor sensor 160. The controller 152 may be configured to record the current operating characteristic 530.

Figure 11:
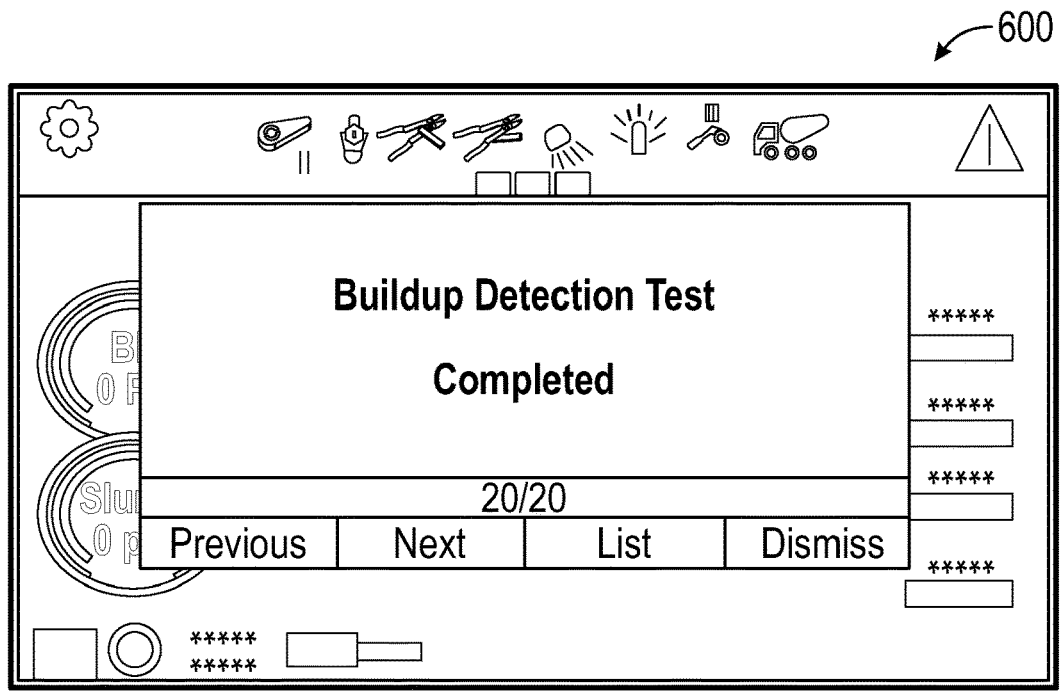
FIG. 11 is a second notification provided by the drum drive systems of FIGS. 3 and 5, according to an exemplary embodiment.
Figure 12:
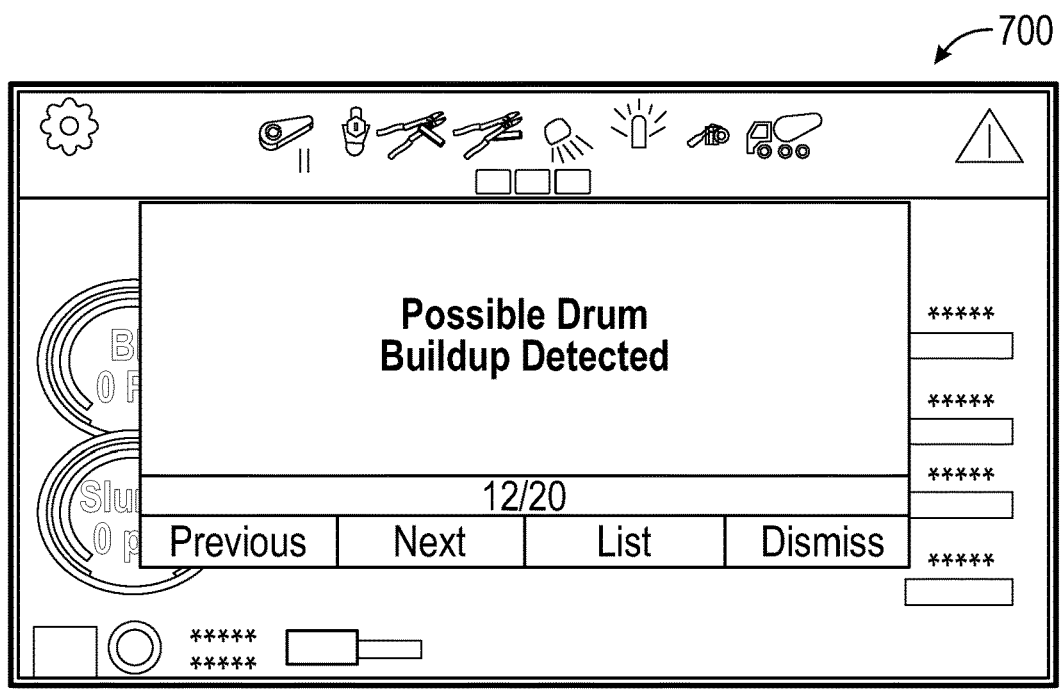
FIG. 12 is a third notification provided by the drum drive systems of FIG. 3, according to an exemplary embodiment.

According to an exemplary embodiment, the controller 152 is configured to compare the baseline operating characteristic 430 determined using the calibration test to the current operating characteristic 530 determined using the buildup detection test, and determine a differential therebetween. The controller 152 is then configured to compare the differential to the pre-stored, preset, predetermined, etc. threshold differential (e.g., from the threshold differential box 330, etc.). As shown in FIG. 11, the controller 152 is configured to provide a first notification, shown as pass notification 600, to the operator with the I/O device 170 indicating that sufficient concrete buildup has not accumulated within the mixer drum 102 in response to the differential being less than the threshold differential. As shown in FIG. 12, the controller 152 is configured to provide a second notification, shown as buildup notification 700, to the operator with the I/O device 170 indicating that sufficient concrete buildup has accumulated within the mixer drum 102 in response to the differential being greater than the threshold differential. In some embodiments, the controller 152 is configured to transmit the results of the buildup detection test to the remote server 180 (e.g., for evaluation by a fleet manager, using any suitable wireless communication protocol, etc.).

Figure 13:
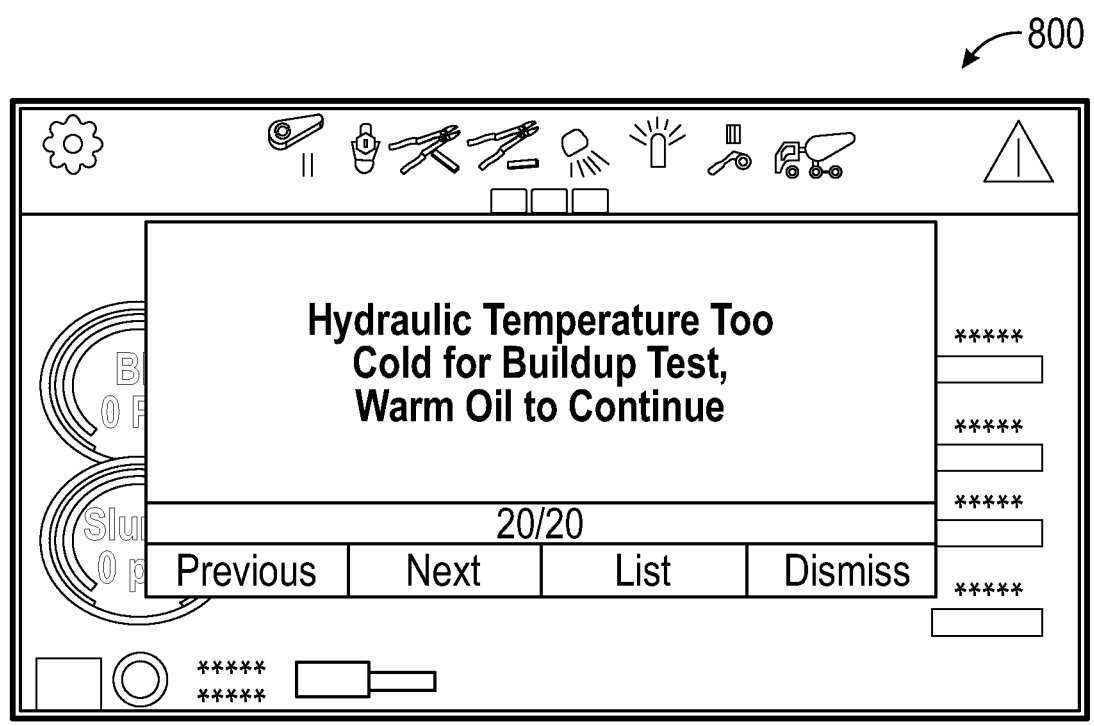
FIG. 13 is a method for performing a calibration test using the drum drive systems of FIGS. 3 and 5, according to an exemplary embodiment.

In some embodiments, the controller 152 is configured to perform the calibration test and/or the buildup detection test only when a minimum hydraulic fluid temperature within the drum drive system 120 has been established (i.e., to ensure consistent viscosity of the hydraulic fluid between tests and, therefore, more accurate results between tests). In some embodiments, the controller 152 is configured to perform the calibration test and/or the buildup detection test only when a minimum motor temperature of the drum motor 126 has been established. Controller 152 may thereby be configured to monitor the temperature of the hydraulic fluid and/or the drum motor 126 within the drum drive system 120 with the temperature sensor 156. As shown in FIG. 13, in instances when the hydraulic fluid temperature within the drum drive system 120 is less than a minimum hydraulic fluid temperature threshold, the controller 152 is configured to provide a third notification, shown as temperature notification 800, to the operator with the I/O device 170. In some embodiments, the temperature notification 800 is used to inform the operator that they must warm the hydraulic fluid further before attempting to initiate the calibration test and/or the buildup detection test (e.g., by running the mixer drum 102 longer, etc.). In other embodiments, the controller 152 is configured to automatically rotate the mixer drum 102 at a nominal speed until the minimum hydraulic fluid temperature threshold is achieved, and then the controller 152 may proceed with the testing (e.g., the calibration test, the buildup detection test, etc.) automatically in response to the fluid temperature exceeding the minimum hydraulic fluid temperature threshold. It should be understood that a nominal speed as used herein may be any speed that the operator chooses and/or any speed that the controller 152 is programmed to implement. A nominal speed is not meant to only mean a minimum or low speed, but may include such meaning. The nominal speed may be lower than, higher than, or even the same as the speed the mixer drum 102 is driven at during the calibration test and the buildup detection test.

Figure 14:
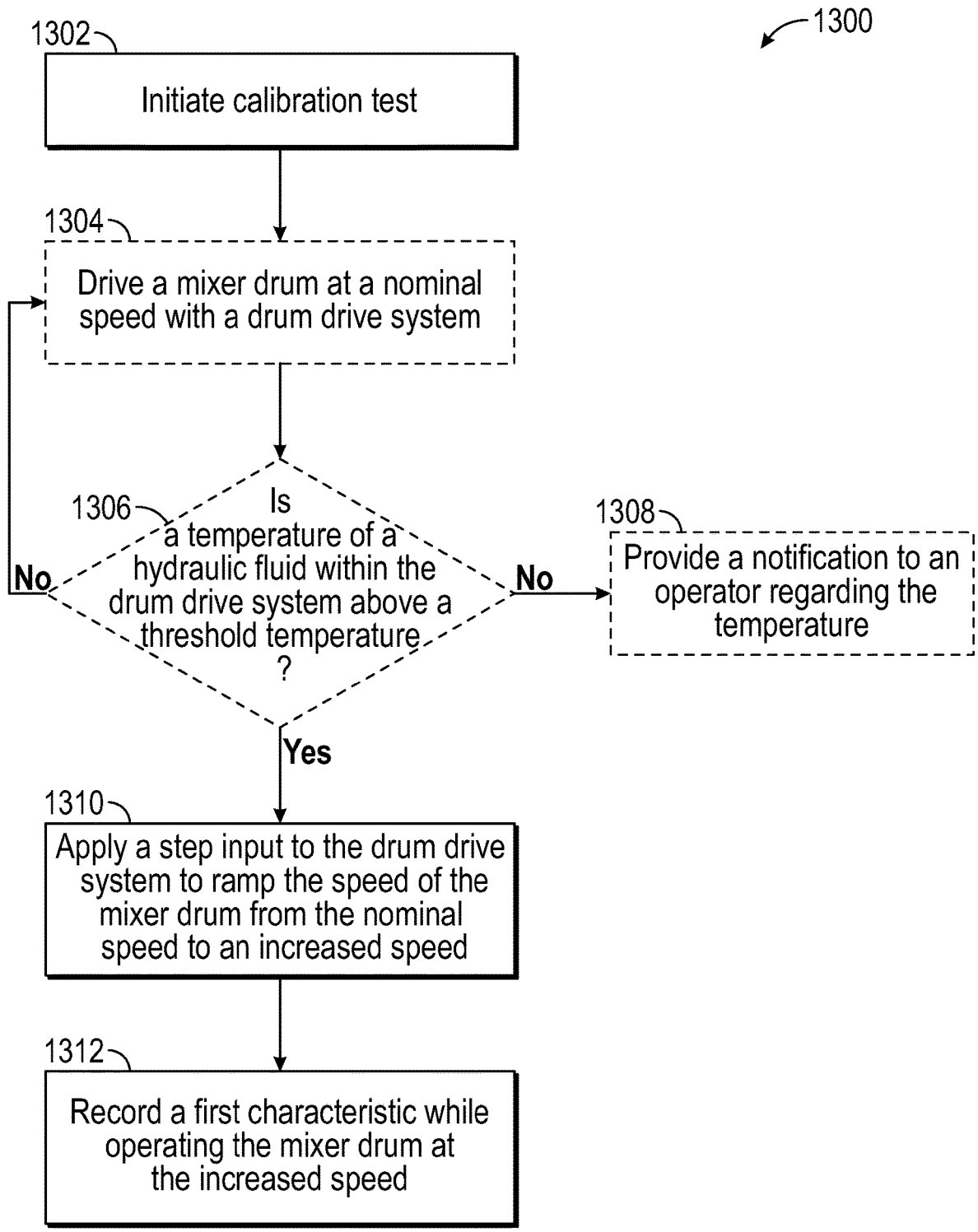
FIG. 14 is a method for performing a buildup detection test using the drum drive systems of FIGS. 3 and 5, according to an exemplary embodiment.

Referring now to FIG. 14, a method 1300 for performing the calibration test is shown, according to an exemplary embodiment. According to an exemplary embodiment, the calibration test is performed when the mixer drum 102 is either new or has been completely cleaned (i.e., there is no or substantially no concrete buildup within the mixer drum 102). At block 1302, a control system (e.g., the controller 152, etc.) is configured to initiate the calibration test (e.g., in response to an operator selecting the calibration button 310, etc.). At block 1304, the control system is configured to drive a mixer drum (e.g., the mixer drum 102, etc.) at a first speed or nominal speed with a drum drive system (e.g., the drum drive system 120, etc.). At block 1306, the control system is configured to determine if a temperature of hydraulic fluid within the drum drive system is above a threshold temperature (e.g., using the temperature sensor 156, etc.). If the temperature of the hydraulic fluid is less than the threshold temperature, the control system is configured to (i) return to block 1304 to continue operating the mixer drum at the nominal speed and/or provide a notification to an operator regarding the temperature (e.g., the temperature notification 800, etc.) (block 1308). If the temperature of the hydraulic fluid is greater than the threshold temperature, the control system is configured to proceed to block 1310. In some embodiments, blocks 1304-1308 are optional (e.g., in embodiments where the drum drive system 120 is an electric drum drive system that does not include a hydraulic system used to drive the mixer drum 102, etc.). In some embodiments, the control system is alternatively configured to determine if a temperature of a motor (e.g., the drum motor 126, etc.) within the drum drive system is above a threshold temperature before proceeding (e.g., in embodiments where the drum drive system 120 is an electric drum drive system, etc.).

At block 1310, the control system is configured to apply a step input (e.g., the step input 410, etc.) to the drum drive system (e.g., to the pump 122 in a hydraulic drum drive system embodiment, to the drum motor 126 in an electric drum drive system embodiment, etc.) to ramp the speed of the mixer drum from the nominal speed to a second speed or an increased speed (e.g., a maximum speed, etc.). At block 1312, the control system is configured to record a first characteristic (e.g., the baseline operating characteristic 430, a peak hydraulic pressure, a peak voltage, a peak current, etc.) while operating the mixer drum at the increased speed. In some embodiments, the mixer drum is operated at the increased speed for less than one minute (e.g., ten seconds, twenty seconds, forty seconds, etc.).

Figure 15:
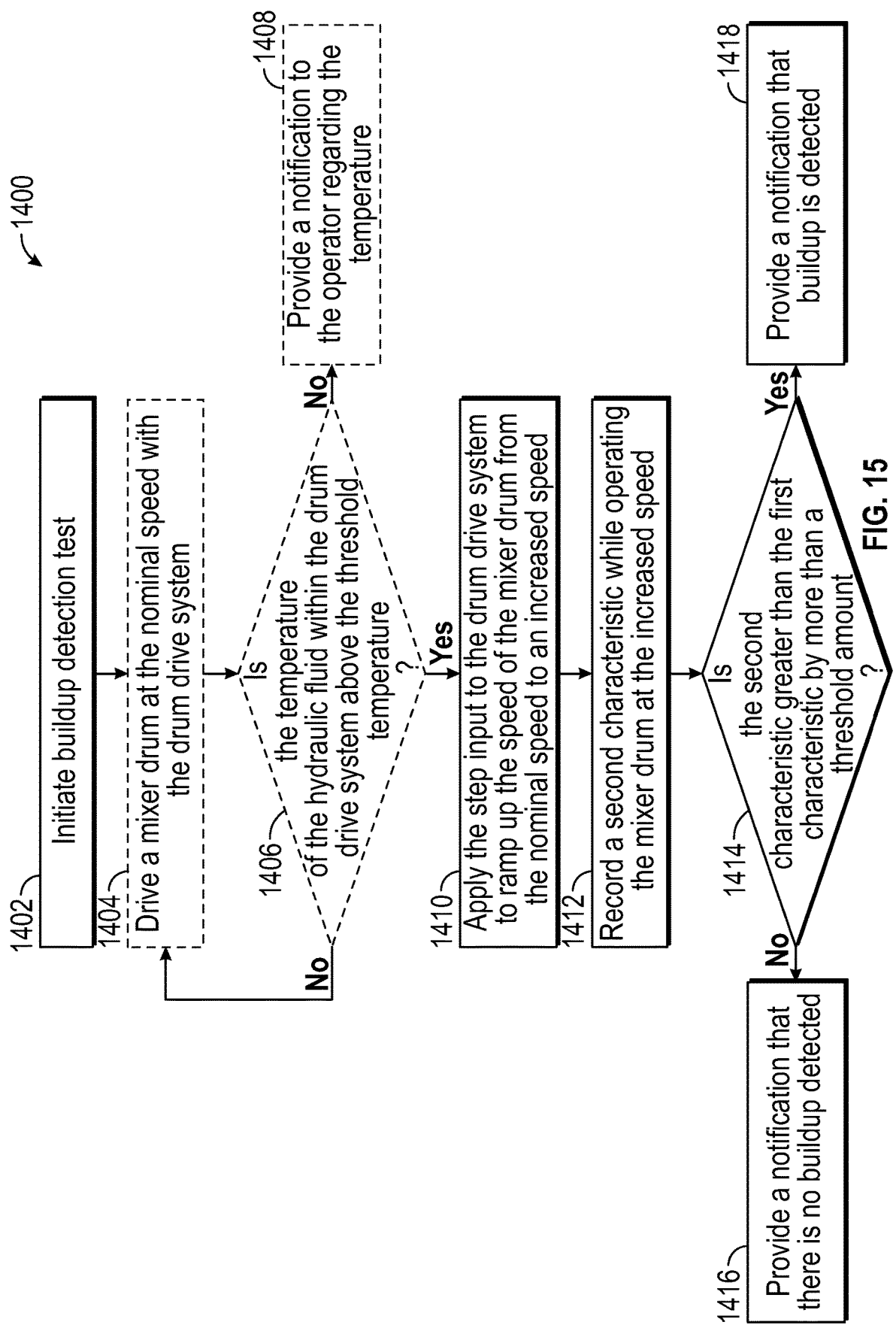
FIG. 15 is a side view of a front pedestal of a concrete mixer truck, according to an exemplary embodiment.

Referring now to FIG. 15, a method 1400 for performing the buildup detection test is shown, according to an exemplary embodiment. According to an exemplary embodiment, the buildup detection test is performed (i) following the calibration test of method 1300, (ii) after one or more uses of the mixer drum 102, and (iii) when the mixer drum 102 has been completely discharged of its contents (i.e., other than the concrete that may have hardened to the wall/fins of the mixer drum 102). At block 1402, the control system is configured to initiate the buildup detection test (e.g., in response to an operator selecting the buildup detection button 340, etc.). At block 1404, the control system is configured to drive the mixer drum at the first speed or the nominal speed with the drum drive system. At block 1406, the control system is configured to determine if the temperature of hydraulic fluid within the drum drive system is above the threshold temperature. If the temperature of the hydraulic fluid is less than the threshold temperature, the control system is configured to (i) return to block 1404 to continue operating the mixer drum at the nominal speed and/or provide the notification to the operator regarding the temperature (block 1408). If the temperature of the hydraulic fluid is greater than the threshold temperature, the control system is configured to proceed to block 1410. In some embodiments, blocks 1404-1408 are optional (e.g., in embodiments where the drum drive system 120 is an electric drum drive system, etc.). In some embodiments, the control system is alternatively configured to determine if the temperature of the motor within the drum drive system is above the threshold temperature before proceeding (e.g., in embodiments where the drum drive system 120 is an electric drum drive system, etc.).

At block 1410, the control system is configured to apply the step input (e.g., the step input 510, etc.) to the drum drive system (e.g., to the pump 122 in a hydraulic drum drive system embodiment, to the drum motor 126 in an electric drum drive system embodiment, etc.) to ramp the speed of the mixer drum from the nominal speed to the second speed or the increased speed (e.g., a maximum speed, etc.). At block 1412, the control system is configured to record a second characteristic (e.g., the current operating characteristic 530, a peak hydraulic pressure, a peak voltage, a peak current, etc.) while operating the mixer drum at the increased speed. At block 1414, the control system is configured to determine if the second characteristic is greater than the first characteristic by more than a threshold amount. If the second characteristic is greater than the first characteristics by less than the threshold amount, the control system is configured to provide a notification (e.g., the pass notification 600, etc.) that there is no buildup detected within the mixer drum (block 1416). If the second characteristic is greater than the first characteristics by more than the threshold amount, the control system is configured to provide a notification (e.g., the buildup notification 700, etc.) that buildup is detected within the mixer drum (block 1418). In some embodiments, the control system is additionally or alternatively configured to provide an indication of the results to a server (e.g., the remote server 180, etc.).

Figure 16:
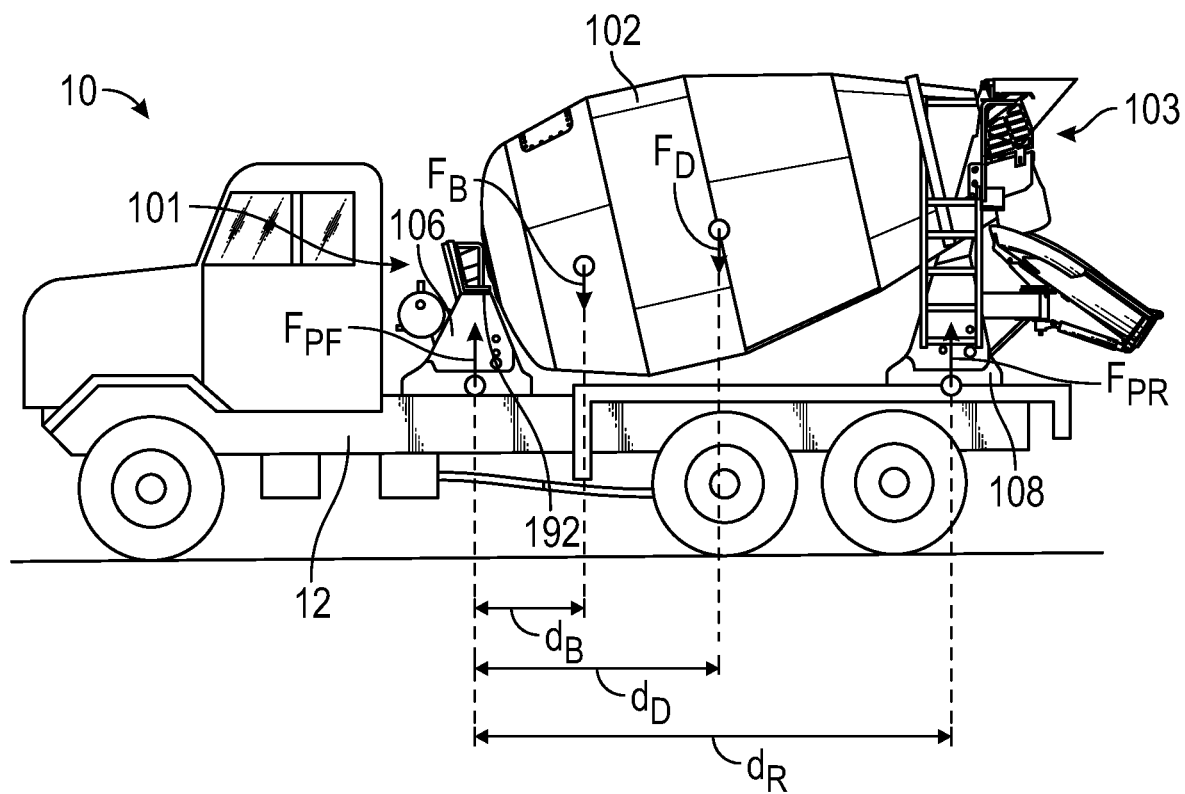
FIG. 16 is a force diagram of a concrete mixer truck, according to an exemplary embodiment.

According to an exemplary embodiment, the control system 150 is further configured to determine a longitudinal position of the concrete buildup within the mixer drum of the concrete mixer truck. Referring now to FIG. 16, a force diagram for a concrete mixer truck is shown, according to an exemplary embodiment. The mixer truck may be the same or similar to the concrete mixer truck 10 described with reference to FIGS. 1 and 2. For convenience, similar numbering will be used to identify similar components. As shown in FIG. 16, the force applied by the mixer drum 102 to the frame 12 of the mixer truck 10 is made up of two separate components, (i) the force, $F_D$, resulting from the mass of the mixer drum 102, and (ii) the force, shown as buildup force $F_B$, resulting from the mass of concrete buildup within the mixer drum 102. The forces opposing movement of the mixer drum 102 proximate to the front pedestal 106 and the rear pedestal 108 are indicated as $F_{PF}$ and $F_{PR}$, respectively.

The concrete buildup forms as a layer of scale on interior surfaces of the mixer drum 102, along a perimeter of an interior volume of the mixer drum 102. A longitudinal position of the concrete buildup within the mixer drum 102, between the forward end 101 and the rear end 103 of the mixer drum 102, will vary depending on a variety of factors, including surface conditions along the interior of the mixer drum 102, the materials used in the concrete mixture, the frequency of loading and unloading, road conditions, and others. In FIG. 16, the longitudinal position is indicated by distance, $d_B$, which corresponds to a distance (in a longitudinal direction) between a center of the load sensor 192 and the center of mass of the concrete buildup within the mixer drum 102. The distance between the load sensor 192 and a center of mass of the mixer drum 102 is indicated by distance, $d_D$. The distance between the load sensor 192 and a center of the rear pedestal 103 is indicated by distance, $d_R$. The dimensions shown in FIG. 16 are provided for illustrative purposes only. It will be appreciated that the relative positioning between different components of the mixer truck 10 may differ in various exemplary embodiments.

The distance, $d_B$, between the load sensor 192 and the concrete buildup may be determined by evaluating the moment and force equilibrium about the load sensor 192, as follows:

$$d_B = \frac{(d_R - d_D)F_D - F_{PF}d_R}{F_B} + d_R \quad (1)$$

where $d_D$, $d_R$, and $F_D$ depend on the components used for the mixer truck 10 and their arrangement along the frame 12, $F_{PF}$ is determined based on information from the load sensor 192, and $F_B$ is determined by one, or a combination of (i) the first characteristic and the second characteristic of the drum drive system, and (ii) the portion $F_{PF}$ of the overall downward force (e.g., $F_B+F_D$) applied by the mixer drum 102 and the concrete buildup to the frame 12 (e.g., front pedestal 106). According to an exemplary embodiment, the design parameters, $d_D$, $d_R$, and $F_D$ are stored in memory within the controller 152 (see FIG. 6). In some embodiments, the design parameters may be manually entered and adjusted by an operator via a user interface (e.g., GUI 200 of FIG. 7). In other embodiments, the design parameters are determined by calibrating the control system before loading any concrete into the mixer truck 10, and/or after removing any concrete buildup from within the mixer drum 102.

Figure 17:
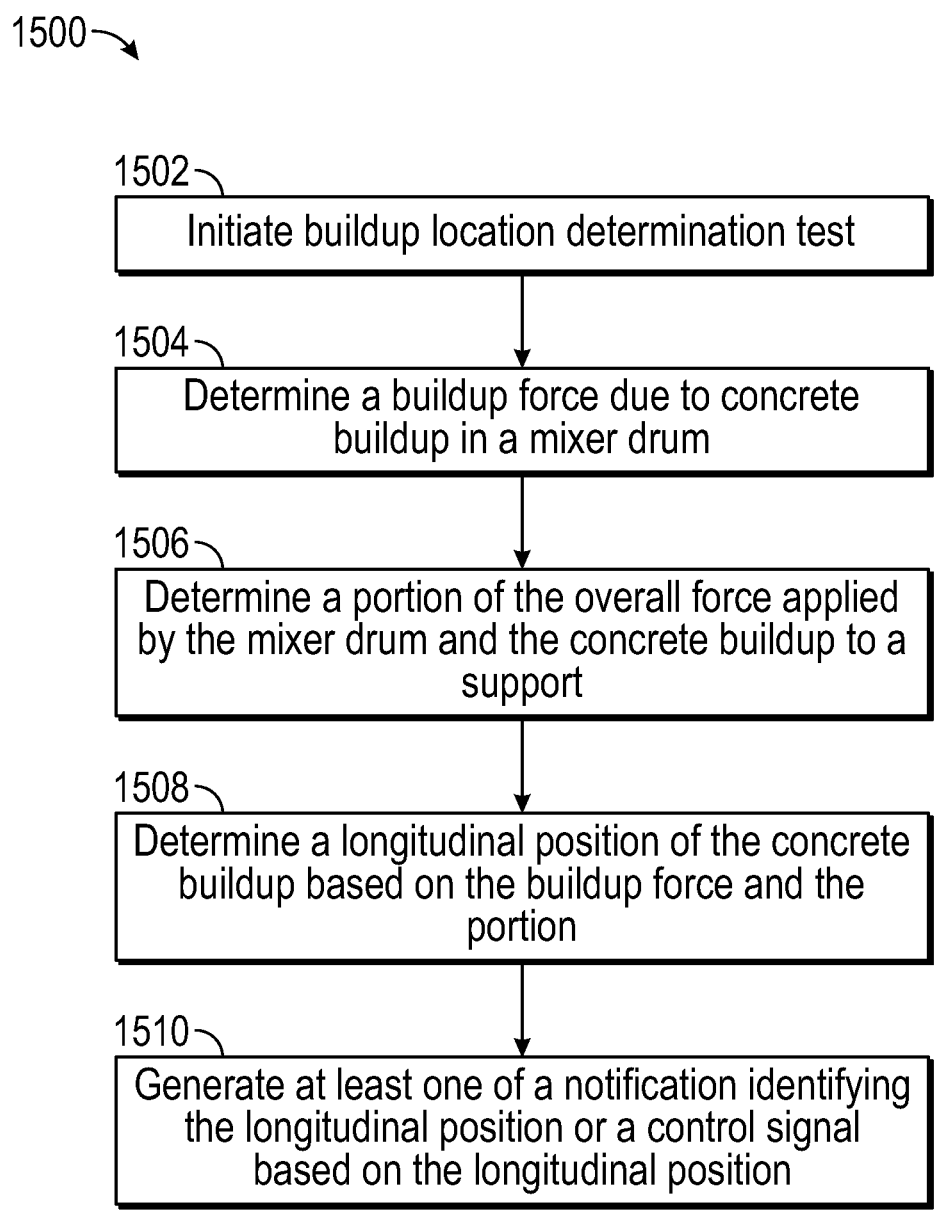
FIG. 17 is a method of performing a concrete buildup location determination test using a concrete buildup location determination system, according to an exemplary embodiment.

Referring now to FIG. 17, a method 1500 of performing a concrete buildup location determination test is shown, according to an exemplary embodiment. According to an exemplary embodiment, the buildup location determination test is performed following the buildup detection test of method 1400. In other embodiments, the method 1500 may be performed as a standalone test. At block 1502, the control system is configured to initiate the buildup detection test (e.g., as part of a sequence in response to an operator selecting the buildup detection button 340, etc.). At block 1504, the control system determines a buildup force, $F_B$ applied to the frame of the mixer truck by concrete buildup in the drum. Block 1504 may include determining the buildup force, $F_B$ based on a difference between the first characteristic of the drum drive system (from block 1312 of method 1300) and the second characteristic of the drum drive system (from block 1412 of method 1400). Block 1504 may include acquiring data from a sensor (e.g., a pressure sensor, a voltage sensor, a current sensor, etc.) that is indicative of a current operating characteristic of the drum drive system in response to the step input of method 1400. For example, block 1504 may include determining the buildup force, $F_B$ based on the increase in hydraulic pressure required to achieve a step input to the drum drive system. The buildup force, $F_B$ may be determined by crawling through a lookup table that includes various values of $F_B$ as a function of the increase in hydraulic pressure, or by using an empirically derived algorithm (e.g., an equation generated by measuring various values of hydraulic pressure as a function of concrete buildup in the drum, etc.). In other embodiments, block 1504 may include determining the buildup force, $F_B$ based on the increase in voltage and/or current (e.g., an amount of voltage draw and/or current draw) required to achieve a step input to the drum drive system (e.g., to an electric motor that is positioned to rotate the drum). In other embodiments, $F_B$ may be determined, at least to first order, based on data from the load sensor (based on a portion $F_{PF}$ of the overall force, $F_D+F_B$, determined by the load sensor). For example, $F_B$ may be determined based on a difference between the portion, $F_{PF}$ of the overall force determined by the load sensor and the dry weight of the drum ($F_D$), without any concrete buildup. In yet other embodiments, $F_B$ may be determined iteratively by using a guess value based on $F_{PF}$.

At block 1506, the control system determines a portion of the overall force applied by the drum and the concrete buildup to the support on which the load sensor is mounted (e.g., the front pedestal 106 of FIG. 16). Block 1506 may include sampling data from the load sensor, and/or converting raw voltage and/or current data from the load sensor to values of force (e.g., using a lookup table, an empirically derived algorithm, etc.). At 1508, the control system determines a longitudinal position of the concrete buildup based on the buildup force, $F_B$ and the portion, $F_{PF}$ of the downward force measured by the load sensor. Block 1508 may include retrieving values for $d_D$, $d_R$, $F_D$, $F_B$ and $F_{PF}$ stored in memory of the control system and evaluating the moment and force equilibrium about the load sensor (via the controller) to determine $d_B$. At block 1510 the control system generates one, or a combination of a notification and a control signal based on the longitudinal position determined in block 1508. Block 1510 may include generating a notification on a display device to indicate the longitudinal position of the concrete buildup within the drum. In other embodiments, block 1510 may include generating an alert (e.g., a sound, alarm, etc.) indicating that the concrete buildup needs to be removed from the drum before operating the mixer truck.

In other embodiments, block 1510 may include transmitting the control signal to at least one component of the mixer truck to take action. For example, block 1510 may include transmitting a control signal to the drum drive system to prevent rotation of the mixer drum until the concrete buildup has been removed. Such locking may occur based on the determined buildup force, $F_B$, the longitudinal position, $d_B$, or some combination thereof. In other embodiments, block 1510 may include transmitting the control signal to the tag axle (e.g., an actuator for the tag axle, etc.), to reposition the tag axle and reduce the load applied to other axles along the mixer truck. For example, the control system may be configured to transmit a control signal to the tag axle to lower the tag axle based on a determination that $d_B$ associated with a given amount of concrete buildup ($F_B$) exceeds a predetermined position threshold (e.g., a position at which 75% of the weight is distributed between rear axles of the vehicle, etc.). In this way, the additional load associated with the concrete buildup can be redistributed, at least until the buildup can be removed from the mixer drum. In other embodiments, the method 1500 may include additional, fewer, and/or different operations.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the concrete mixer truck 10, the drum assembly 100, the control system 150, and the systems and components thereof as shown in the various exemplary embodiments is illustrative only. Additionally, any element disclosed in one embodiment may be incorporated or utilized with any other embodiment disclosed herein. Although only one example of an element from one embodiment that can be incorporated or utilized in another embodiment has been described above, it should be appreciated that other elements of the various embodiments may be incorporated or utilized with any of the other embodiments disclosed herein.

The invention claimed is:

1. A vehicle comprising:
a chassis;
a drum coupled to the chassis and configured to mix drum contents received therein;
a load detection system coupled to the chassis, the load detection system comprising a load sensor positioned proximate to one of a forward end of the drum or a rear end of the drum, the load sensor configured to determine a portion of a force applied by the drum to the chassis; and
a control system communicably coupled to the load detection system, the control system configured to:
determine a longitudinal position of a concrete buildup in the drum based on the portion; and
generate at least one of a notification indicating the longitudinal position or a control signal based on the longitudinal position.

2. The vehicle of claim 1, further comprising a support that is disposed between one of the forward end of the drum and the chassis or the rear end of the drum and the chassis, wherein the load sensor is a plate load cell that is coupled to the support.

3. The vehicle of claim 1, further comprising a display device, wherein the control system is configured to generate the notification on the display device indicating the longitudinal position of the concrete buildup within the drum.

4. The vehicle of claim 1, wherein determining the longitudinal position of the concrete buildup comprises:
determining a buildup force associated with a weight of the concrete buildup; and
evaluating a moment and force equilibrium based on the portion and the buildup force.

5. The vehicle of claim 1, further comprising:
a drum drive system coupled to the drum and including a driver positioned to rotate the drum; and
a sensor positionable to facilitate monitoring an operating characteristic of the drum drive system,
wherein determining the longitudinal position of the concrete buildup comprises determining a buildup force associated with a weight of the concrete buildup, comprising:
storing a baseline operating characteristic for the drum drive system;
providing a step input to the driver to rotate the drum;
acquiring data from the sensor indicative of a current operating characteristic of the drum drive system in response to the step input; and
determining the buildup force based on a difference between the current operating characteristic and the baseline operating characteristic.

6. The vehicle of claim 5, wherein the driver includes a fluid pump driven by an engine, wherein the fluid pump is configured to provide a pressurized fluid to a fluid motor to rotate the drum, wherein the sensor includes a pressure sensor, and wherein the operating characteristic includes a pressure of the pressurized fluid, the baseline operating characteristic is a baseline pressure of the pressurized fluid, and the current operating characteristic is a current pressure of the pressurized fluid.

7. The vehicle of claim 5, wherein the driver includes an electric motor, wherein the sensor includes at least one of a voltage sensor or a current sensor, and wherein the operating characteristic includes at least one of a voltage or an amount of current draw of the electric motor, the baseline operating characteristic includes at least one of a baseline voltage or a baseline amount of current draw of the electric motor, and the current operating characteristic includes at least one of a current voltage or a current amount of current draw of the electric motor.

8. The vehicle of claim 1, wherein determining the longitudinal position of the concrete buildup comprises determining a buildup force associated with a weight of the concrete buildup based on the portion and a weight of the drum when the drum is empty and clean.

9. The vehicle of claim 1, further comprising a drum drive system coupled to the drum and including a motor positioned to rotate the drum to agitate the drum contents, wherein the control system is communicably coupled to the drum drive system and is configured to generate the control signal to control operation of the drum drive system in response to at least one of the portion or the longitudinal position.

10. The vehicle of claim 1, further comprising a tag axle coupled to the chassis, wherein the tag axle includes a pair of tractive elements, and wherein the control system is communicably coupled to the tag axle and is configured to generate the control signal to lower the tag axle in response to the longitudinal position.

11. The vehicle of claim 1, wherein the longitudinal position is a position within the drum, between the forward and the rear end of the drum, at which the concrete buildup has accumulated.

12. A concrete buildup location determination system for a concrete mixer, the concrete buildup location determination system comprising:
    a load sensor positionable to facilitate monitoring a portion of a force applied by a drum of the concrete mixer to a chassis of the concrete mixer; and
    a control system communicably coupled to the load sensor, the control system configured to:
        determine the portion from the load sensor;
        determine a longitudinal position of a concrete buildup within the drum based on the portion; and
    generate at least one of a notification indicating the longitudinal position or a control signal based on the longitudinal position.

13. The concrete buildup location determination system of claim 12, wherein the load sensor is a plate load cell that is configured to couple to a support between the drum and the chassis.

14. The concrete buildup location determination system of claim 12, wherein the control system is configured to be communicably coupled to a drum drive system of the concrete mixer, and wherein the control system is configured to generate the control signal to control operation of the drum drive system in response to at least one of the portion or the longitudinal position.

15. The concrete buildup location determination system of claim 12, wherein determining the longitudinal position of the concrete buildup comprises:
    determining a buildup force associated with a weight of the concrete buildup; and
    evaluating a moment and force equilibrium based on the portion and the buildup force.

16. The concrete buildup location determination system of claim 12, further comprising a sensor positionable to facilitate monitoring an operating characteristic of a drum drive system of the concrete mixer, wherein determining the longitudinal position of the concrete buildup within the drum comprises determining a buildup force associated with a weight of the concrete buildup, comprising:
    storing a baseline operating characteristic for the drum drive system;
    providing a step input to a driver of the drum drive system to rotate the drum;
    acquiring data from the sensor indicative of a current operating characteristic of the drum drive system in response to the step input; and
    determining the buildup force based on a difference between the current operating characteristic and the baseline operating characteristic.

17. A method, comprising:
    determining, by a control system of a concrete mixer, a portion of a force applied by a drum of a vehicle that is coupled to a chassis of the vehicle and that is configured to mix drum contents received therein, to a chassis of the vehicle based on a signal received from a load sensor positioned proximate to one of a forward end of the drum or a rear end of the drum;
    determining, by the control system, a longitudinal position of a concrete buildup in the drum based on the portion; and
    generating, by the control system, at least one of a notification indicating the longitudinal position or a control signal based on the longitudinal position.

18. The method of claim 17, further comprising transmitting the control signal to a drum drive system of the concrete mixer to control rotation of the drum in response to at least one of the portion or the longitudinal position.

19. The method of claim 17, wherein determining the longitudinal position of the concrete buildup comprises:
    determining, by the control system, a buildup force associated with a weight of the concrete buildup; and
    evaluating, by the control system, a moment and force equilibrium based on the portion and the buildup force.

20. The method of claim 17, wherein determining the longitudinal position of the concrete buildup comprises determining a buildup force associated with a weight of the concrete buildup, comprising:
    storing, by the control system, a baseline operating characteristic for a drum drive system of the concrete mixer that controls rotation of the drum;
    providing, by the control system, a step input to a driver of the drum drive system to rotate the drum;
    acquiring, by the control system, data from a sensor onboard the concrete mixer in response to the step input, the data indicative of a current operating characteristic of the drum drive system; and
    determining, by the control system, the buildup force based on a difference between the current operating characteristic and the baseline operating characteristic.

* * * * *